(12) United States Patent
Vinjam et al.

(10) Patent No.: US 10,868,956 B2
(45) Date of Patent: Dec. 15, 2020

(54) PICTURE-TAKING TECHNIQUE FOR SELF-PHOTOGRAPHY USING DEVICE HAVING CAMERA AND DEVICE THEREFOR

(71) Applicant: SAMSUNG ELECTRONICS CO., LTD., Suwon-si (KR)

(72) Inventors: Vishnu Vardhan Vinjam, Seoul-si (KR); Apoorv Kansal, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 15/754,970

(22) PCT Filed: Aug. 24, 2016

(86) PCT No.: PCT/KR2016/009389
§ 371 (c)(1),
(2) Date: Feb. 23, 2018

(87) PCT Pub. No.: WO2017/034321
PCT Pub. Date: Mar. 2, 2017

(65) Prior Publication Data
US 2020/0244873 A1  Jul. 30, 2020

(30) Foreign Application Priority Data
Aug. 24, 2015 (KR) .......................... 10-2015-0118712

(51) Int. Cl.
*H04N 5/232* (2006.01)
*G06K 9/00* (2006.01)
(Continued)

(52) U.S. Cl.
CPC ..... *H04N 5/23222* (2013.01); *G06K 9/00295* (2013.01); *G08B 5/36* (2013.01);
(Continued)

(58) Field of Classification Search
CPC .. H04N 5/23222; G06K 9/00295; G08B 5/36; G08B 6/00
(Continued)

(56) References Cited

U.S. PATENT DOCUMENTS

2005/0046730 A1* 3/2005 Li ...................... H04N 5/23293
348/333.12
2007/0285528 A1 12/2007 Mise et al.
(Continued)

FOREIGN PATENT DOCUMENTS

CN 101086604 A 12/2007
CN 101370087 A 2/2009
(Continued)

OTHER PUBLICATIONS

Communication dated Sep. 29, 2019 issued by the State Intellectual Property Office of P.R. China in counterpart Chinese Application No. 201680049317.1.
(Continued)

*Primary Examiner* — Usman A Khan
(74) *Attorney, Agent, or Firm* — Sughrue Mion, PLLC

(57) ABSTRACT

The present disclosure provides a method for supporting photograph in a device having a camera, the method comprising the operations of: recognizing the face of a subject within a photographing area of a camera when the camera is driven; determining a signal instructing to change the photographing area, on the basis of information about the recognized face; and outputting the signal instructing to change the photographing area, on the basis of the determination.

17 Claims, 28 Drawing Sheets

(51) Int. Cl.
*G08B 5/36* (2006.01)
*G08B 6/00* (2006.01)
(52) U.S. Cl.
CPC ............ *G08B 6/00* (2013.01); *H04N 5/23218* (2018.08); *H04N 5/232939* (2018.08)
(58) Field of Classification Search
USPC ......................................................... 348/345
See application file for complete search history.

(56) References Cited

U.S. PATENT DOCUMENTS

| | | | | |
|---|---|---|---|---|
| 2008/0239092 | A1* | 10/2008 | Sugino | H04N 5/23216 348/222.1 |
| 2008/0273798 | A1* | 11/2008 | Asukai | G06K 9/00221 382/190 |
| 2009/0016645 | A1* | 1/2009 | Sako | G06K 9/00308 382/298 |
| 2009/0102942 | A1* | 4/2009 | Yoshizumi | H04N 5/23219 348/222.1 |
| 2009/0115868 | A1* | 5/2009 | Kim | H04N 5/232 348/222.1 |
| 2009/0244323 | A1* | 10/2009 | Carter | H04N 5/23222 348/231.99 |
| 2010/0066840 | A1* | 3/2010 | Asukai | H04N 5/23219 348/207.1 |
| 2010/0149369 | A1* | 6/2010 | Yasuda | H04N 5/232 348/222.1 |
| 2011/0317031 | A1 | 12/2011 | Honda | |
| 2013/0222663 | A1 | 8/2013 | Rydenhag et al. | |
| 2014/0078372 | A1* | 3/2014 | Yamashita | G06K 9/00228 348/333.02 |
| 2014/0192217 | A1* | 7/2014 | Kim | H04N 5/23222 348/222.1 |
| 2016/0092724 | A1 | 3/2016 | Jeong | |
| 2016/0205340 | A1 | 7/2016 | Jang et al. | |
| 2017/0195581 | A1* | 7/2017 | Suzuki | H04N 5/2351 |
| 2017/0339332 | A1* | 11/2017 | Kano | H04N 5/23212 |

FOREIGN PATENT DOCUMENTS

| | | |
|---|---|---|
| CN | 103916592 A | 7/2014 |
| JP | 2007-329784 A | 12/2007 |
| JP | 2008-289095 A | 11/2008 |
| JP | 2009-55449 A | 3/2009 |
| JP | 2009-105705 A | 5/2009 |
| JP | 2010-278624 A | 12/2010 |
| KR | 10-2009-0017355 A | 2/2009 |
| WO | 2014/189216 A1 | 11/2014 |
| WO | 2015/122624 A1 | 8/2015 |

OTHER PUBLICATIONS

Int. Search Report dated Nov. 23, 2016 issued by the Int. Searching Authority in Application No. PCT/KR2016/009389 (PCT/ISA/210).
Written Opinion dated Nov. 23, 2016 issued by the Int. Searching Authority in Application No. PCT/KR2016/009389 (PCT/ISA/237).

* cited by examiner

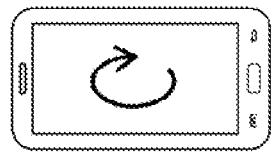
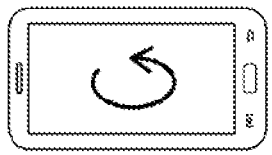
FIG.4A  FIG.4B
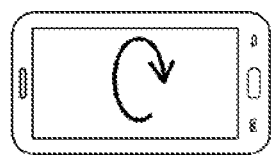
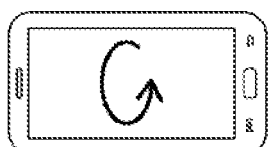
FIG.4C  FIG.4D
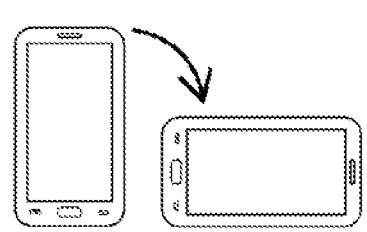
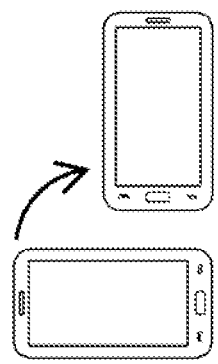
FIG.4E  FIG.4F
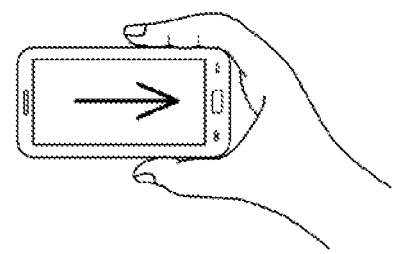
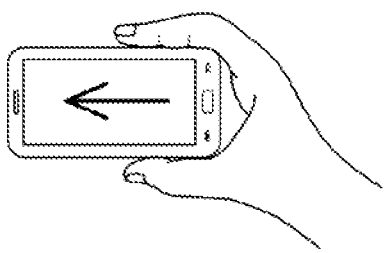
FIG.4G  FIG.4H

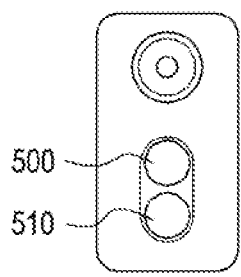
FIG.5A   FIG.5B   FIG.5C
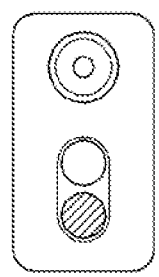
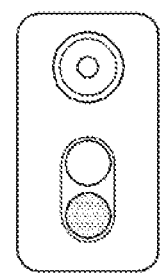
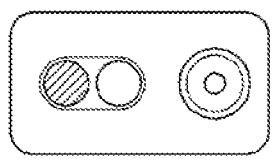
FIG.5D
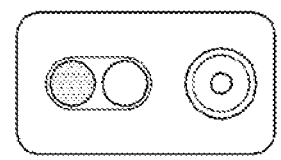
FIG.5E
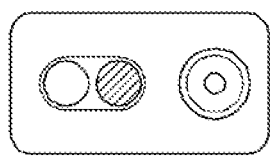
FIG.5F
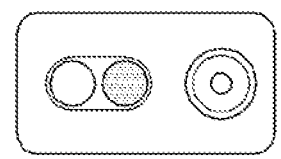
FIG.5G
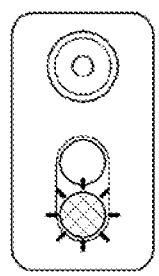
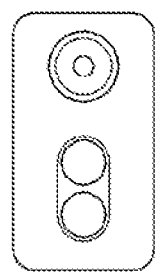
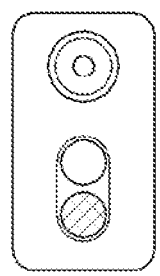
FIG.5H   FIG.5I   FIG.5J

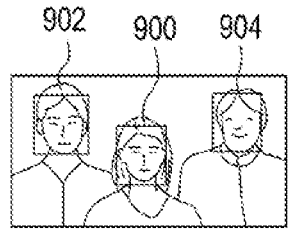
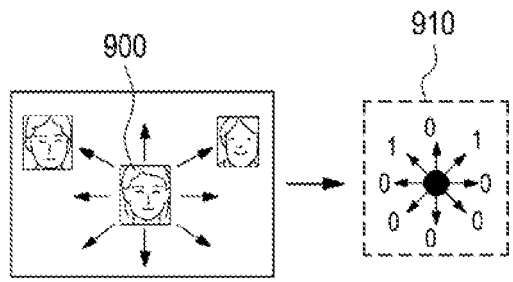
FIG.9A    FIG.9B
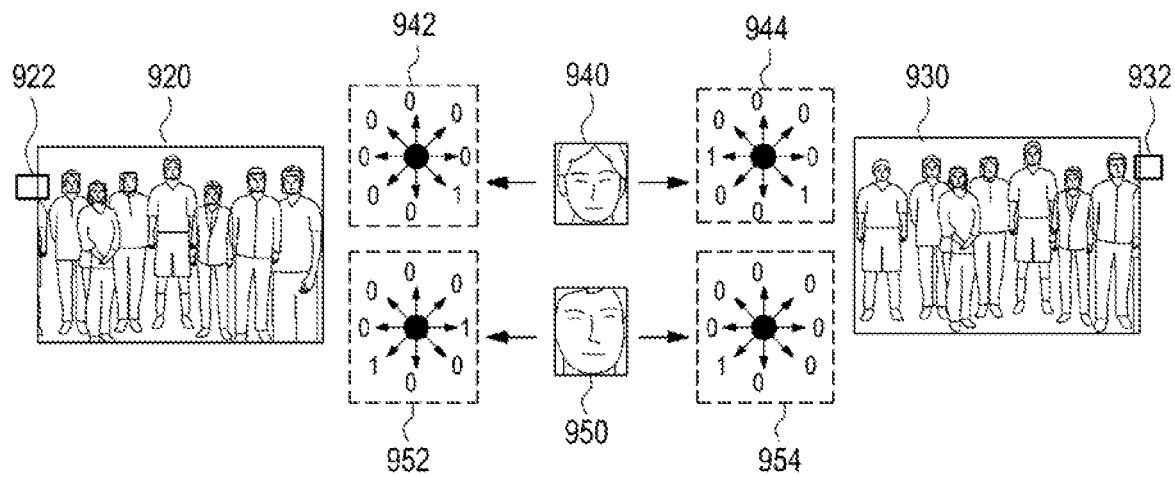
FIG.9C

PICTURE-TAKING TECHNIQUE FOR SELF-PHOTOGRAPHY USING DEVICE HAVING CAMERA AND DEVICE THEREFOR

CROSS-REFERENCE TO RELATED APPLICATIONS

This application is a National Stage application under 35 U.S.C. § 371 of PCT/KR2016/009389 filed on Aug. 24, 2016, which claims priority from Korean Patent Application No. 10-2015-0118712 filed on Aug. 24, 2015 in the Korean Intellectual PROPERTY Office, all the disclosures of which are incorporated in their entireties by reference.

TECHNICAL FIELD

The present disclosure relates to a method for supporting picture-taking in an apparatus equipped with a camera, and more particularly, to a supporting method for providing a cue so that an improved selfie shot or snapshot may be taken.

BACKGROUND ART

As user equipments (UEs) having a digital camera, such as smartphones or tablets, have recently become popular, taking a picture of a user himself or herself (that is, a selfie) using a UE having a camera has become a routine.

FIG. 1 illustrates an exemplary picture taken in the form of a selfie by a user.

Referring to FIG. 1, it may be noted that a picture has been taken, including full or partial faces of users corresponding to subjects within a frame.

In general photography, a user takes a picture, checking a subject through a viewfinder. Thus, a picture may be taken with the subject located at an appropriate position in a frame. Meanwhile, the user takes a selfie by pressing a shooting button, while the user directs a lens of a UE having a camera toward the user. That is, the user takes a selfie without checking the subject appropriately through a viewfinder. As a result, an incomplete picture of the subject is taken, for example, the subject may not be included fully or partially in the frame or may not be located at an appropriate position.

DETAILED DESCRIPTION OF THE INVENTION

Technical Problem

The present disclosure provides a method for enabling a selfie shot or snapshot including an intended subject just by one click (or one button input).

Further, the present disclosure provides a method for preventing a user equipment (UE) having a camera from taking a selfie shot or snapshot in which the whole or a part of a subject is not included in a picture-taking range, or a subject is disposed at an appropriate position.

Further, the present disclosure provides a method for preventing a shot in which an unknown person is included in a picture-taking range.

Technical Solution

In an aspect of the present invention, a method for supporting picture-taking in an apparatus equipped with a camera include recognizing the face of a subject in a picture-taking range of the camera, when the camera is driven, determining a signal indicating changing of the picture-taking range, based on information about the recognized face, and outputting the signal indicating changing of the picture-taking range, based on the determination.

In another aspect of the present invention, an apparatus equipped with a camera, for supporting picture-taking includes the camera for recognizing the face of a subject in a picture-taking range, and a controller for determining a signal indicating changing of the picture-taking range based on information about the recognized face, and controlling output of the signal indicating changing of the picture-taking range based on the determination.

Advantageous Effects

According to the present disclosure, a user may take a selfie easily. Further, the user may take a picture in which a subject is disposed at an appropriate position in a picture-taking range, simply by one click (or one button input).

According to the present disclosure, a user may take a complete selfie including a subject, irrespective of whether the user is an expert or a novice.

Further, according to the present disclosure, a user may take a picture in which an unintended subject (for example, an unknown person) is excluded simply by one click.

BRIEF DESCRIPTION OF THE DRAWINGS

FIG. 4 is an exemplary view illustrating outputs of visual signals indicating changing of a picture-taking range on a display in a UE equipped with a camera according to the present disclosure;

FIG. 5 is an exemplary view illustrating outputs of visual signals indicating changing of a picture-taking range through light emitting diode (LED) flash lights in a UE equipped with a camera according to the present disclosure;

FIG. 9 is an exemplary view illustrating a method for recognizing a missed face in a picture-taking range, taking an actual picture for example in a UE equipped with a camera according to the present disclosure;

MODE FOR CARRYING OUT THE INVENTION

Embodiments of the present disclosure will be described below in detail with reference to the attached drawings. A detailed description of a generally known function or structure of the present disclosure will be avoided lest it should obscure the subject matter of the present disclosure. Although the terms used in the present disclosure are defined in consideration of functions in the present disclosure, the terms may be changed according to the intention of a user or an operator, or customs. Therefore, the present disclosure should be understood, not simply by the actual terms used but by the meanings of each term lying within.

Before a detailed description of the present disclosure, some terms used in the present disclosure may be interpreted as, but not limited to, the following meanings.

In the present disclosure, a 'user equipment (UE) equipped with a camera' refers to any type of apparatus having a digital camera, that is, an 'apparatus equipped with a camera'. For example, the UE may be any of a smartphone, a tablet, and a compact camera. The UE may be referred to as a mobile station (MS), a mobile equipment (ME), a device, a terminal, and so on.

In the present disclosure, a picture-taking range means a target range to be captured by a UE equipped with a camera. As a user presses a shooting button for the picture-taking range, the user may take a picture of the picture-taking range. The picture-taking range may be replaced with the term, frame.

In the present disclosure, a missed face refers to a face which is expected to be included but is not actually included in a picture-taking range.

In the present disclosure, an unknown face refers to the face of a person that is not known to a user that takes a picture.

In the present disclosure, a cut face refers to a face which is included not fully but partially in a picture-taking range.

The present disclosure proposes a method for recognizing the face of a subject (face recognition) in a picture-taking range and transmitting a signal indicating changing of the picture-taking range, using information about the recognized face by a UE equipped with a camera, so that a user may change the picture-taking range of the camera.

FIG. 2 is an exemplary view illustrating a face recognition process in a UE equipped with a camera according to the present disclosure.

Figure 1:
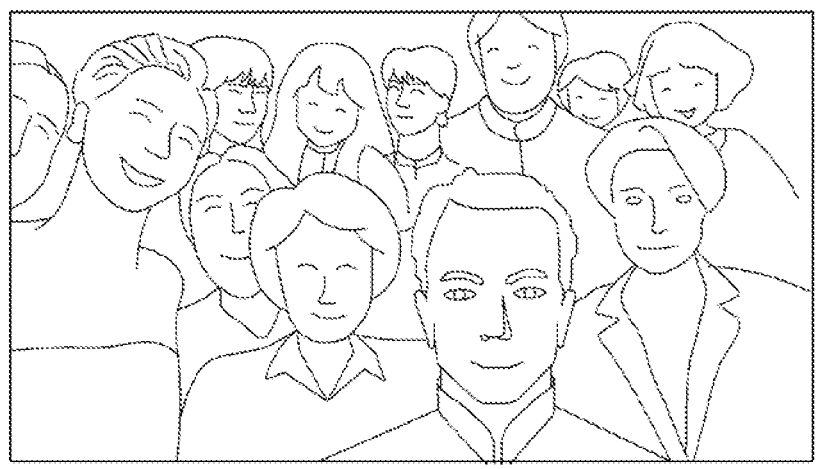
FIG. 1 is an exemplary view illustrating a picture taken in the form of a selfie by a user.
Figure 2A:
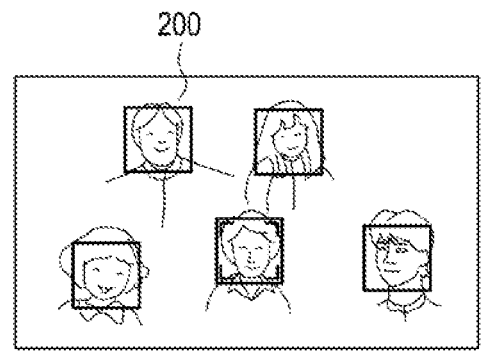
FIG. 2 is an exemplary view illustrating a face recognition process of a user terminal (UE) equipped with a camera according to the present disclosure.
Figure 2B:
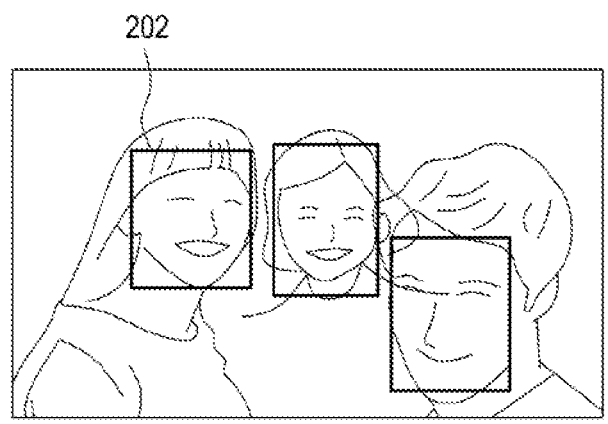
Figure 2C:
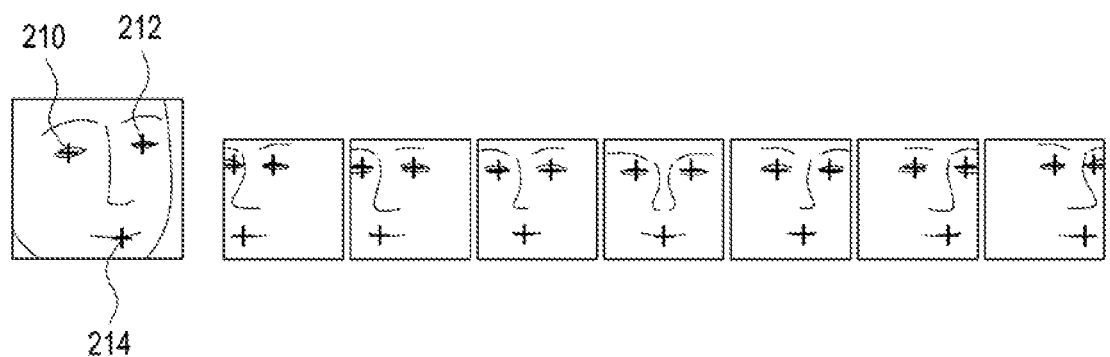

Face recognition is a technique of recognizing a person in a picture. FIGS. 2(a) and 2(b) illustrate an exemplary operation of recognizing the face of a subject (that is, a person) in a picture-taking range of a camera in a UE equipped with the camera. In FIG. 2(a) or FIG. 2(b), squares (for example, 200 and 202) drawn around the faces of persons represent recognition of the faces of the persons within the picture-taking range in the UE equipped with the camera. The face of a person may be recognized at every facial angle. Each person (that is, face) in the picture-taking range may be identified uniquely based on a relative position or shape of the eyes, mouth, nose, cheekbones, or chin of the person. FIG. 2(c) illustrates identification of one person at various facial angles. Cross-shaped points 210, 212, and 214 in a square drawn around a face represent the positions of eyes and a mouth recognized by the face recognition technique. This face recognition technique may be used to determine operations required to take a picture including all subjects appropriately. A detailed description of specific implementation of the face recognition technique will be avoided herein lest it should obscure the subject matter of the present disclosure.

Figure 3:
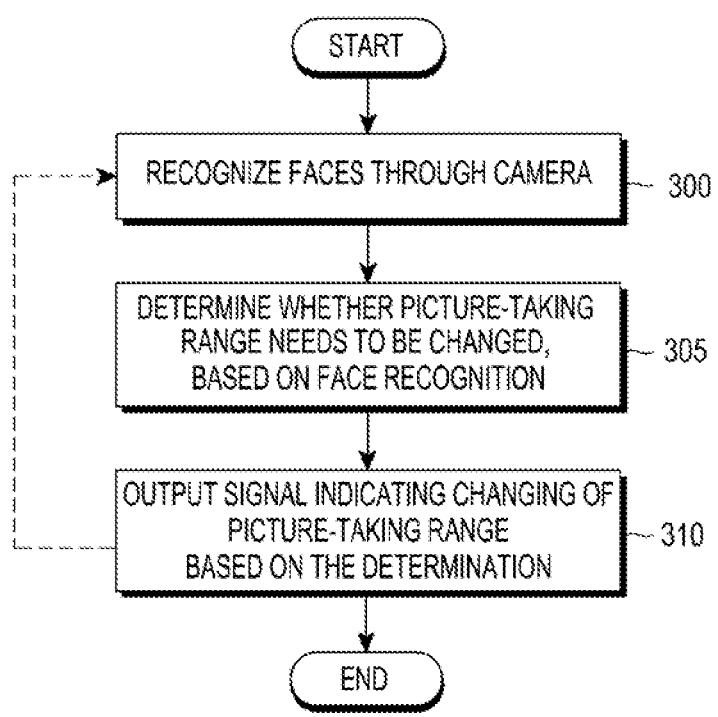
FIG. 3 is an exemplary view illustrating a method for supporting a preferred selfie shot based on face recognition in a UE equipped with a camera according to the present disclosure.

FIG. 3 is an exemplary view illustrating a method for supporting a preferred selfie shot based on face recognition in a UE equipped with a camera according to the present disclosure.

The camera of the UE may be driven by, for example, a camera application. Once the camera of the UE is driven, the UE performs face recognition on subjects in a picture-taking range of the camera (300). The subjects may be, for example, persons.

The UE may determine whether the current picture-taking range needs to be changed based on the result of the face recognition operation 300. If the current picture-taking range needs to be changed, the UE may determine a signal indicating changing of the picture-taking range (305). For example, the UE may determine that the picture-taking range needs to be changed, for example, by checking whether the recognized faces are fully included in the picture-taking range of the UE. In this manner, the UE may prevent a picture including a cut face. In another example, the UE may determine that the picture-taking range needs to be changed by comparing information about faces recognized in a previous picture-taking range with information about the faces recognized in the current picture-taking range. Thus, the UE may include a missed face in a picture. In another example, the UE may determine that the picture-taking range needs to be changed by calculating the differences between three-dimensional (3D) distances of the faces included in the picture-taking range. Thus, the UE may eliminate an unknown face (the face of a person unknown to a user which is to take a selfie) in the picture-taking range.

The UE may output the signal indicating changing of the picture-taking range based on the determination made (305). In the present disclosure, the 'signal' may be replaced by the term, 'cue'. The signal indicating changing of the picture-taking range may be represented in various forms that may be output in the UE. For example, the indication signal may take the form of a visual signal output through a display, a light emitting diode (LED) flash light, or the like, a sound signal output through a speaker, or a vibration signal output through a vibrator.

Additionally, upon occurrence of a change in the picture-taking range in response to the signal indicating changing of the picture-taking range (by the user), the UE may support a preferred selfie shot by performing again at least one of the face recognition operation 300, the operation 305 of determining whether a picture-taking range needs to be changed, and the operation 310 of outputting a signal indicating changing of the picture-taking range.

FIG. 4 is an exemplary view illustrating outputs of visual signals indicating changing of a picture-taking range on a display in a UE equipped with a camera according to the present disclosure.

That is, the UE equipped with the camera according to the present disclosure may output a visual signal in the form of an image or an icon illustrated in the example of FIG. 4 through a display. A user viewing the visual signal may perform an operation corresponding to the visual signal so that a direction in which the camera of the UE faces may be adjusted. As a consequence, the picture-taking range of the camera may be changed.

FIG. 4(a) illustrates an exemplary signal indicating an action of turning a left end of the UE in an opposite direction to the user, that is, indicating 'turn left'.

FIG. 4(b) illustrates an exemplary signal indicating an action of turning a right end of the UE in an opposite direction to the user, that is, indicating 'turn right'.

FIG. 4(c) illustrates an exemplary signal indicating an action of turning a top end of the UE in an opposite direction to the user, that is, indicating 'turn up'.

FIG. 4(d) illustrates an exemplary signal indicating an action of turning a bottom end of the UE in an opposite direction to the user, that is, indicating 'turn down'.

FIG. 4(e) illustrates an exemplary signal indicating an action of turning the vertical UE in a horizontal direction, that is, indicating 'rotate 90-horizontal' or 'flip'.

FIG. 4(f) illustrates an exemplary signal indicating an action of turning the horizontal UE in a vertical direction, that is, indicating 'rotate 90-vertical' or 'flip'.

FIG. 4(g) illustrates an exemplary signal indicating an action of moving the UE to the right (without rotation), that is, indicating 'move right'.

FIG. 4(h) illustrates an exemplary signal indicating an action of moving the UE to the left (without rotation), that is, indicating 'move left'.

FIG. 5 is an exemplary view illustrating outputs of visual signals indicating changing of a picture-taking range through LED flash lights in a UE equipped with a camera according to the present disclosure.

FIGS. 5(a) to 5(j) illustrate an exemplary case in which the UE equipped with the camera includes two LED flash lights 500 and 510 next to a camera lens.

FIGS. 5(a) to 5(g) illustrate exemplary signals indicating changing of a picture-taking range based on colors of the LED flash lights, and FIGS. 5(h) to 5(j) illustrate exemplary signals indicating changing of a picture-taking range according to blinking rates of the LED flash lights.

FIG. 5(a) is an exemplary view illustrating a state in which both of the LED flash lights 500 and 510 are off, and thus the UE does not output a signal to a user.

FIG. 5(b) illustrates an exemplary signal indicating 'move down' by turning (for example) the 'lower' LED flash light corresponding to a downward direction in which the UE is to be moved, (for example) in red, when the two LED flash lights are arranged vertically. FIG. 5(c) illustrates an exemplary signal indicating that the user has changed the picture-taking range appropriately by turning the 'lower' LED flash light (for example) in green.

FIG. 5(d) illustrates an exemplary signal indicating 'move left' by turning (for example) a 'left' LED flash light corresponding to a left direction in which the UE is to be moved, (for example) in red, when the two LED flash lights are arranged horizontally. FIG. 5(e) illustrates an exemplary signal indicating that the user has changed the picture-taking range appropriately by turning the 'left' LED flash light (for example) in green.

FIG. 5(f) illustrates an exemplary signal indicating 'move right' by turning (for example) a 'right' LED flash light corresponding to a right direction in which the UE is to be moved, (for example) in red, when the two LED flash lights are arranged horizontally. FIG. 5(g) illustrates an exemplary signal indicating that the user has changed the picture-taking range appropriately by turning the 'right' LED flash light (for example) in green.

FIG. 5(*h*) illustrates an exemplary signal indicating 'move down' by blinking (for example) the 'lower' LED flash light corresponding to the downward direction in which the UE is to be moved, (for example) in red, when the two LED flash lights are arranged vertically. If the user has moved the UE in the preferred direction in response to the indication signal of FIG. 5(*h*), the UE may indicate that the preferred change is made by increasing or decreasing the blinking rate (blinking speed) of the 'lower' LED flash light. For example, if it is indicated by decreasing the blinking rate that the preferred change is made, user completion of an appropriate change in the picture-taking range may be indicated by (for example) completely turning off the blinking 'lower' LED flash light illustrated in FIG. 5(*h*), as illustrated in FIG. 5(*i*). For example, if it is indicated by increasing the blinking rate that the preferred change is made, user completion of an appropriate change in the picture-taking range may be indicated by (for example) completely turning on the blinking 'lower' LED flash light illustrated in FIG. 5(*h*), as illustrated in FIG. 5(*j*).

Figure 6:
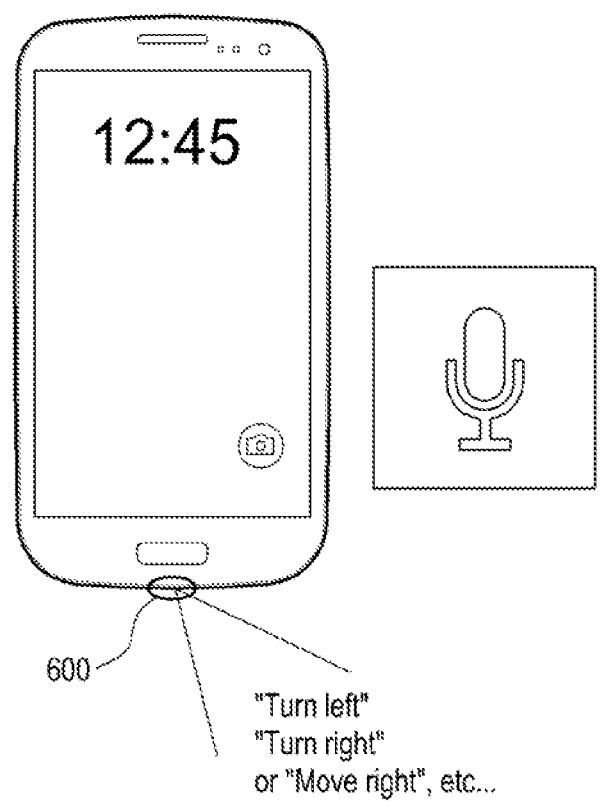
FIG. 6 is an exemplary view illustrating outputs of sound signals indicating changing of a picture-taking range through a speaker in a UE equipped with a camera according to the present disclosure.
Figure 7A:
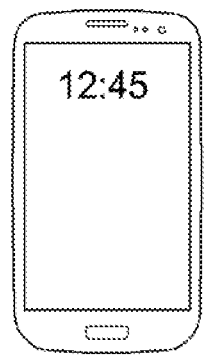
FIG. 7 is an exemplary view illustrating outputs of vibration signals indicating changing of a picture-taking range through vibrators in a UE equipped with a camera according to the present disclosure.
Figure 7B:
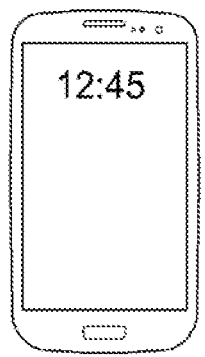
Figure 7C:
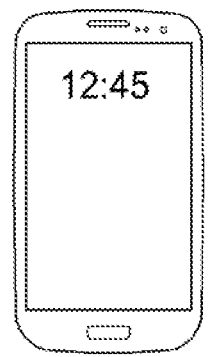
Figure 7D:
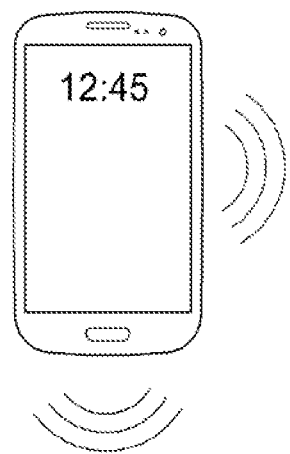
Figure 7E:
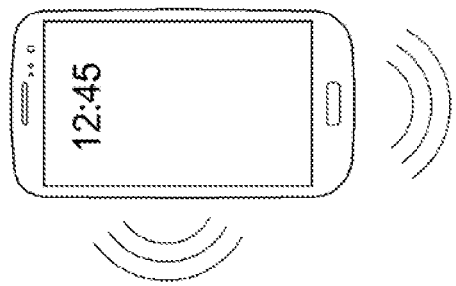

FIG. 6 is an exemplary view illustrating outputs of sound signals indicating changing of a picture-taking range through a speaker in a UE equipped with a camera according to the present disclosure.

For example, the UE may output a voice signal through a speaker 600, such as "Turn left", "Turn right", "Turn up", "Turn down", "Move left", "Move right", "Move up", "Move down", "Move backward", "Move forward", "Rotate 90 degrees", "Zoom in", or "Zoom out". In another example, the UE may output a sound signal such as a beep sound to a user. Herein, actions to be indicated may be distinguished from each other by differentiating the numbers of beep sounds.

FIG. 7 is an exemplary view illustrating outputs of vibration signals indicating changing of a picture-taking range through vibrators in a UE equipped with a camera according to the present disclosure.

According to the present disclosure, as the UE has a vibrator at each of four ends of a housing, the four ends may generate vibrations individually. That is, the UE may indicate an action of changing a picture-taking range to a user by localized vibrations.

FIG. 7(*a*) illustrates an exemplary vibration signal indicating an action of turning the right end of the UE in an opposite direction to a user, that is, indicating 'turn right' by driving the right-end vibrator and thus generating the vibration signal at the right end of the UE in the UE.

FIG. 7(*b*) illustrates an exemplary vibration signal indicating an action of turning the left end of the UE in an opposite direction to the user, that is, indicating 'turn left' by driving the left-end vibrator and thus generating the vibration signal at the left end of the UE in the UE.

FIG. 7(*c*) illustrates an exemplary vibration signal indicating an action of turning the bottom end of the UE in an opposite direction to the user, that is, indicating 'turn down' by driving the bottom-end vibrator and thus generating the vibration signal at the bottom end of the UE in the UE.

FIGS. 7(*d*) and 7(*e*) illustrate exemplary vibration signals indicating 90-degree rotations, which are generated by driving vibrators at two adjacent ends among the four ends of the UE. For example, FIG. 7(*d*) illustrates an exemplary vibration signal indicating an action of turning the vertical UE in a horizontal direction, that is, 'rotate 90-horizontal' by outputting vibration signals simultaneously at the bottom end and the right end. For example, FIG. 7(*e*) illustrates an exemplary vibration signal indicating an action of turning the horizontal UE in a vertical direction, that is, 'rotate 90-vertical' by outputting vibration signals simultaneously at the bottom end and the left end.

Now, a detailed description will be given of the operation 305 for determining whether a picture-taking range needs to be changed in the supporting method of the UE equipped with the camera according to the present disclosure.

Figure 8:
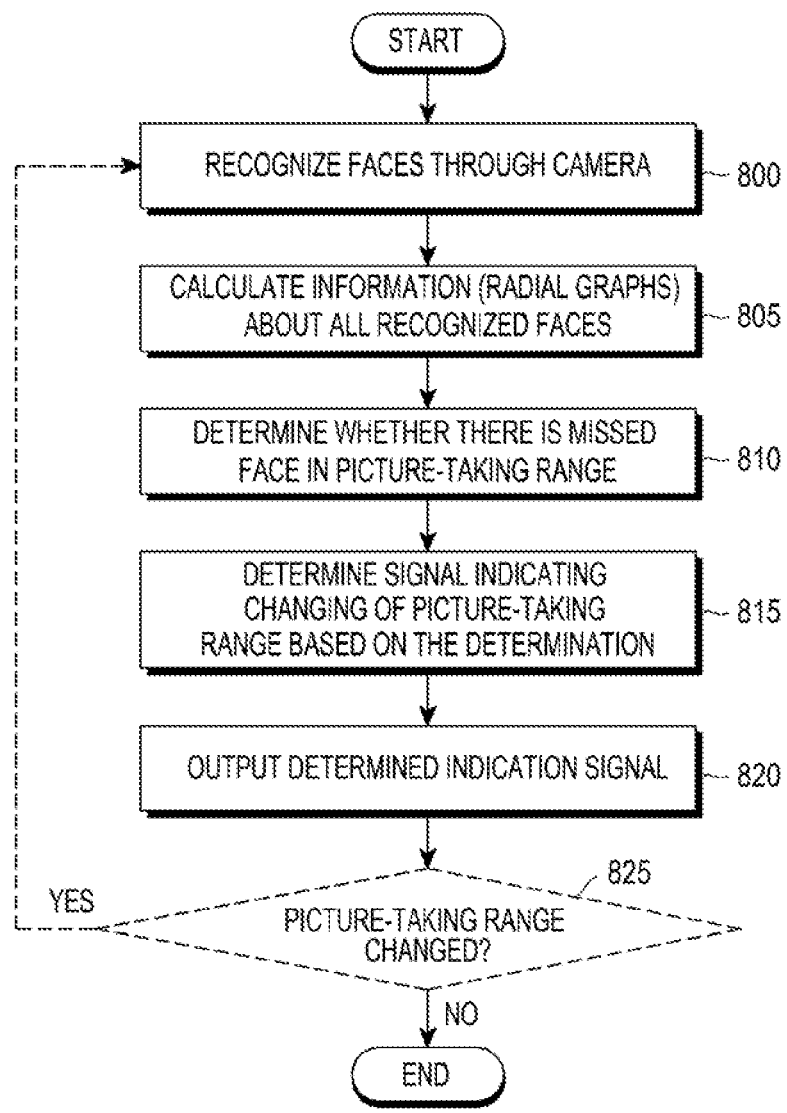
FIG. 8 is an exemplary view illustrating a process of recognizing a missed face in a picture-taking range and outputting a signal indicating changing of a picture-taking range in a UE equipped with a camera according to the present disclosure.

FIG. 8 is an exemplary view illustrating a process of recognizing a missed face in a picture-taking range and outputting a signal indicating changing of a picture-taking range in a UE equipped with a camera according to the present disclosure.

The camera of the UE may be driven by, for example, a camera application. Once the camera of the UE is driven, the UE performs face recognition on subjects within a picture-taking range of the camera (800).

The UE calculates information about all of the recognized faces (805). Information about a face may be, for example, the numbers of recognized faces around the face, and may be represented as a radial graph. The radial graph may be calculated for each uniquely identified face. The radial graph will be described below in detail with reference to FIG. 9.

The UE may determine whether there is a missed face in the picture-taking range based on the information about the recognized faces (810). The determination of whether there is a missed face in the picture-taking range may be made by a comparison with information about faces recognized in a previous picture-taking range, stored in the UE. That is, the UE may compare the information (for example, radial graphs) about the faces recognized in the previous picture-taking range with the information about the faces recognized in the current picture-taking range, and if the two pieces of information do not match, the UE may determine that there is a missed face in the current picture-taking range. If the UE initially performs face recognition, there is no picture-taking range to be compared with the current picture-taking range. Therefore, the operation 810 may not be performed.

The UE may determine that the picture-taking range needs to be changed according to the result of the determination, and determine a signal indicating changing of the picture-taking range (815). For example, if determining that there is a missed face in the left side of the current picture-taking range, the UE may determine a signal indicating 'turn left' or 'move left' in any of various available forms (a visual signal, a sound signal, or a vibration signal), because the UE needs to extend the picture-taking range to the left.

Subsequently, the UE may output the determined signal (820). Optionally, the UE may simultaneously output the indication signal in two or more forms having the same meaning. For example, when a selfie is taken using a rear camera of the UE, the user is not capable of viewing a visual signal on a display. Therefore, a visual signal and a voice signal may be simultaneously output through an LED flash light and a speaker, respectively, in order to increase awareness for the user.

Optionally, the UE may further determine whether the user has changed the picture-taking range, after outputting the signal indicating changing of the picture-taking range (825). In this case, the UE may support an improved selfie shot by performing operations 800 to 820 again.

FIG. 9 is an exemplary view illustrating a method for recognizing a missed face in a picture-taking range, taking an actual picture for example in a UE equipped with a camera according to the present disclosure.

When the user takes a picture using a front camera or a rear camera of the UE, the UE may prompt the user to adjust the camera by notifying the user of a missed face through face recognition.

The UE may uniquely recognize all faces included in a picture-taking range, and store information about the recognized faces. For example, the UE may calculate radial-direction numbers for each recognized face in the form of a radial graph.

In FIG. 9(a), three faces recognized in a part of a picture-taking range are represented as three squares 900, 902, and 904.

FIG. 9(b) is an exemplary view illustrating calculation of information about the face 900 that the UE has recognized uniquely. For example, the UE may calculate the numbers of other faces recognized around the face 900 in the form of a radial graph 910. The radial graph 910 illustrated in FIG. 9(b) indicates that there is one recognized face in the 10 o'clock direction of the face 900, and there is one recognized face in the 2 o'clock direction of the face 900.

FIG. 9(c) illustrates the principle that a determination is made on the presence of a missed face by comparing information about faces recognized in two picture-taking ranges.

For example, it is assumed that a right image 930 represents a previous picture-taking range, and a left image 920 represents a current picture-taking range. A radial graph 944 for a face 940 recognized in the previous picture-taking range indicates that there is one face in each of the 9 o'clock direction and 4 o'clock direction of the face 940. A radial graph 942 for the face 940 recognized in the current picture-taking range 920 indicates that there is one face only in the 4 o'clock direction of the face 940. Therefore, the UE may determine that one face 922 has been missed in the current picture-taking range 920.

In another example, it is assumed that the left image 920 represents the previous picture-taking range, and the right image 930 represents the current picture-taking range. A radial graph 952 for a face 950 recognized in the previous picture-taking range 920 indicates that there is one face in each of the 8 o'clock direction and 3 o'clock direction of the face 950. A radial graph 954 for the face 950 recognized in the current picture-taking range 930 indicates that there is one face only in the 8 o'clock direction of the face 950. Therefore, the UE may determine that one face 932 has been missed in the current picture-taking range 930.

Therefore, the UE may determine that the picture-taking range needs to be changed in order to include the missed face 922 or 932, and output a corresponding signal indicating changing of the picture-taking range.

Figure 10:
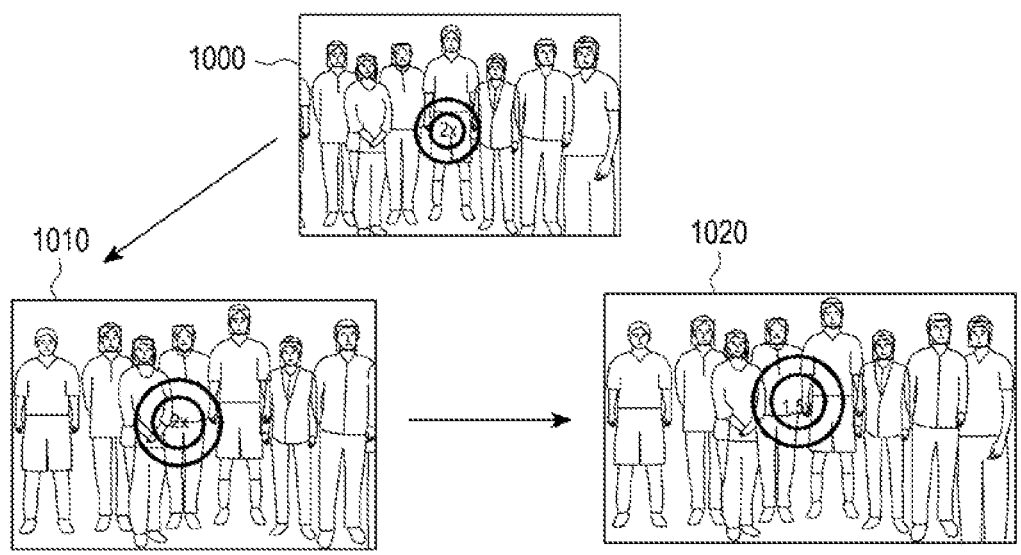
FIG. 10 is an exemplary view illustrating a method for recognizing a missed face and taking a selfie, using a zoom function of a UE in a UE equipped with a camera according to the present disclosure.

FIG. 10 is an exemplary view illustrating a method for recognizing a missed face and taking a selfie, using a zoom function of a UE in the UE equipped with a camera according to the present disclosure.

Having determined that there is a missed face in the left side of a first picture-taking range 1000 through face recognition, the UE may output a first signal indicating changing of the picture-taking range (move left). A second picture-taking range 1010 is a picture-taking range after the camera is adjusted according to the first signal. Having determined that there is a missed face in the right side of the second picture-taking range 1010 through face recognition, the UE may output a second signal indicating zoom-out instead of a signal indicating right movement, because the UE is aware that there may be a face already missed in the left side. For example, the second picture-taking range 1010 is a twice-zoomed result, and a third picture-taking range 1020 is a 1.5 times-zoomed result. Optionally, the UE may take a picture-taking range by directly 'zooming out' the lens, without outputting the signal indicating 'zoom-out' to the user.

Figure 11:
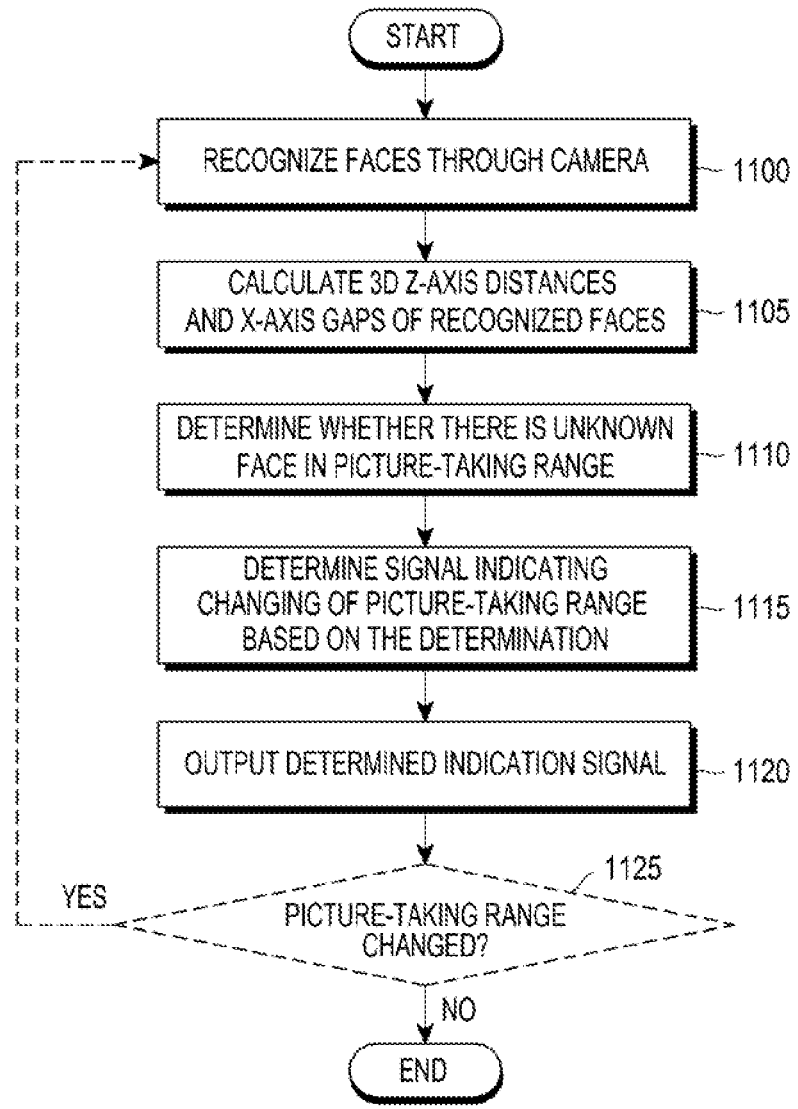
FIG. 11 is an exemplary view illustrating a process of recognizing an unknown face in a picture-taking range and outputting a signal indicating changing of the picture-taking range in a UE equipped with a camera according to the present disclosure.

FIG. 11 is an exemplary view illustrating a process of recognizing an unknown face in a picture-taking range and outputting a signal indicating changing of the picture-taking range in a UE equipped with a camera according to the present disclosure.

The camera of the UE may be driven by, for example, a camera application. Once the camera of the UE is driven, the UE may perform face recognition on subjects in a picture-taking range of the camera (1100).

The UE calculates 3D distances (that is, z-axis distances) and two-dimensional (2D) distances (that is, x-axis gaps) between the recognized faces (1105). The UE may determine candidates for an 'unknown' face using the z-axis distances and the x-axis gaps. Optionally, the operation of determining candidates for an unknown face using z-axis distances and x-axis gaps may include operations illustrated in the example of FIG. 12.

The UE may determine whether there is an unknown face in the picture-taking range based on the calculated z-axis distances and x-axis gaps (1110). For example, the UE may determine that a face having a z-axis distance from a specific face (for example, a face closest to the center of the picture-taking range) larger than a predetermined threshold is an 'unknown face'. In another example, the UE may determine that a face having a largest z-axis distance from a specific face (for example, a face closest to the center of the picture-taking range) is an 'unknown face'. For example, the UE may determine that a face having an x-axis gap from a specific face (for example, a face closest to the center of the picture-taking range) larger than a predetermined threshold is an 'unknown face'. In another example, the UE may determine that a face having a largest x-axis gap from a specific face (for example, a face closest to the center of the picture-taking range) is an 'unknown face'. In another example, the UE may define one or more clusters each being a set of fiducial points within a recognized face, and determine that a face within a cluster having a small number of fiducial points is an unknown face. The method for determining an unknown face using clusters will be described in more detail with reference to FIG. 16.

The UE may determine that the picture-taking range needs to be changed according to the result of the determination, and determine a signal indicating changing of the picture-taking range (1115). For example, if the UE determines that there is a missed face in the left side of the current picture-taking range, the UE may determine a signal indicating 'turn right' or 'move right' in any of various available forms (a visual signal, a sound signal, or a vibration signal), because the UE needs to extend the picture-taking range to the left.

To help understanding of an indicated direction, the position of a face in a picture-taking range is opposite to a user which is to take a selfie. Thus, the indication signal indicates 'turn right' or 'move right' in the opposite direction to the position (left) of the missed face, from the viewpoint of the user. In the present disclosure, a direction indicated by an indication signal may be described based on this understanding.

Subsequently, the UE may output the determined signal (1120). Optionally, the UE may simultaneously output the indication signal in two or more forms having the same meaning.

Optionally, the UE may further determine whether the user has changed the picture-taking range, after outputting the signal indicating changing of the picture-taking range (1125). In this case, the UE may support an improved selfie shot by performing operations 1110 to 1120 again.

Figure 12:
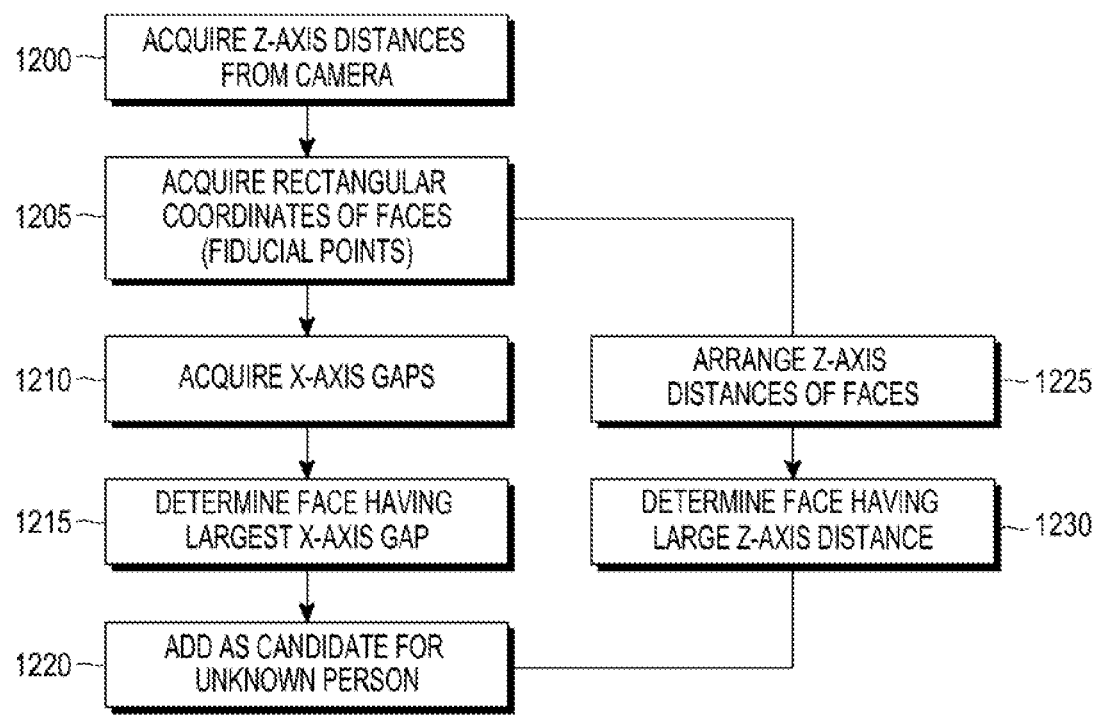
FIG. 12 is an exemplary view illustrating a process of determining a candidate for an unknown face located in a picture-taking range by calculating a z-distance and a z-gap in a UE equipped with a camera according to the present disclosure.

FIG. 12 is an exemplary view illustrating a process of determining a candidate for an unknown face located in a picture-taking range by calculating a z-distance and a z-gap in a UE equipped with a camera according to the present disclosure.

Once the UE recognizes faces by driving the camera, the UE may acquire z-axis distances between the recognized faces from the camera (1200). The concept of acquiring the z-axis distances of recognized faces in the UE will be described with reference to the example of FIG. 13.

The UE may acquire the rectangular coordinates of the faces recognized in the picture-taking range (1205). The UE acquires x-axis gaps between the faces using the rectangular coordinates (1210). The UE determines a face having a largest x-axis gap from among the faces in the picture-taking range (1215).

The UE may arrange the acquired z-axis distances in the order of their values (1225). The UE determines a face having a largest z-axis distance or a z-axis distance larger than a predetermined threshold (1230).

The UE may determine a face having the determined largest x-axis gap, the face having the determined largest z-axis distance, or the face having a z-axis distance larger than the predetermined threshold as a candidate for an unknown face (1220).

Figure 13:
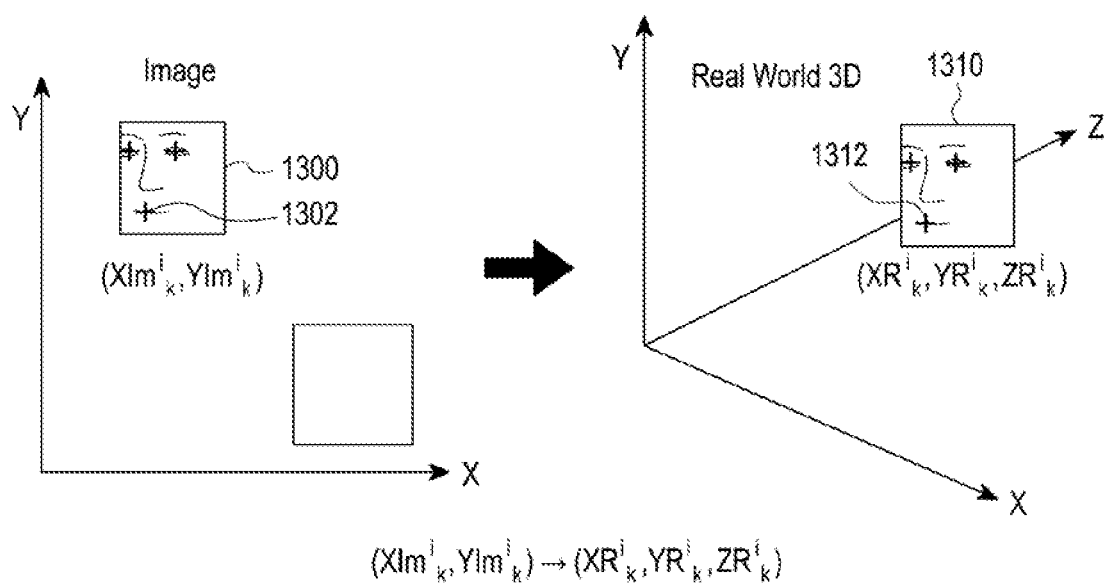
FIG. 13 is an exemplary view illustrating the concept of acquiring a z-distance of a face recognized in a picture-taking range in a UE equipped with a camera according to the present disclosure.

FIG. 13 is an exemplary view illustrating the concept of acquiring a z-axis distance of a face recognized in a picture-taking range in a UE equipped with a camera according to the present disclosure.

The 2D rectangular coordinates of one fiducial point 1302 within a face 1300 recognized in a picture-taking range may be represented as $(XIm^i_k, YIm^i_k)$. Herein, $XIm^i_k$ represents the x coordinate of an $i^{th}$ fiducial point of a $k^{th}$ face, and $YIm^i_k$ represents the y coordinate of the $i^{th}$ fiducial point of the $k^{th}$ face. The UE may convert the 2D rectangular coordinates of the fiducial point 1302 of the face 1300 to the 3D rectangular coordinates $(XR^i_k, YR^i_k, ZR^i_k)$ of a fiducial point 1312 of a face 1310 in a real space. Herein, $XR^i_k$ represents the x coordinate of an $i^{th}$ fiducial point of a $k^{th}$ face, $YR^i_k$ represents the y coordinate of the $i^{th}$ fiducial point of the $k^{th}$ face, and $ZR^i_k$ represents the z coordinate of the $i^{th}$ fiducial point of the $k^{th}$ face.

The UE may calculate z-axis distances between faces, using the z coordinate of the face 1300 in the picture-taking range.

For example, the UE may perform a process of calculating a 3D z coordinate from 2D rectangular coordinates in the following manner. First, the UE may perform a pre-process of generating a model required to determine a z coordinate. The pre-process may include an operation of collecting 2D fiducial points and 3D position training data, and an operation of building the model from the 3D training data. Subsequently, the UE determines a z coordinate using the mode in the following procedure. First, the UE recognizes a face through the camera. Secondly, the UE detects the 2D rectangular coordinates of a fiducial point of the recognized face. Thirdly, the UE inputs the 2D rectangular coordinates to the model. Fourthly, the UE may acquire the z coordinate of the fiducial point from the model.

Figure 14:
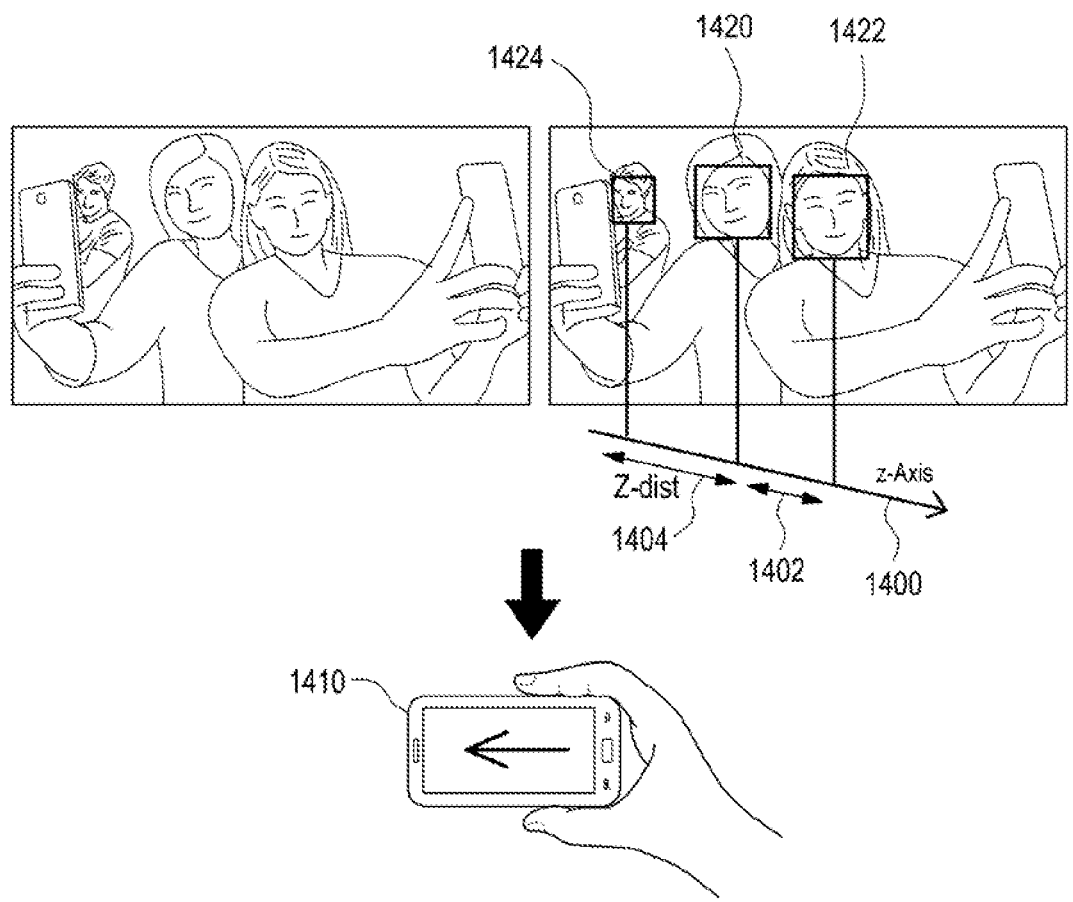
FIG. 14 is an exemplary view illustrating a case in which an unknown face is recognized in a picture-taking range in a UE equipped with a camera according to the present disclosure.

FIG. 14 is an exemplary view illustrating a case in which an unknown face is recognized in a picture-taking range in a UE equipped with a camera according to the present disclosure.

The left image of FIG. 14 is an exemplary current picture-taking range of the UE. Faces recognized in the picture-taking range by the UE are represented as squares 1420, 1422, and 1424 in the right image.

The UE calculates z-axis distances of the faces recognized in the picture-taking range. An x-axis gap on a 2D plane between the first face 1420 and the second face 1422 is similar to an x-axis gap on a 2D plane between the first face 1420 and the third face 1424. However, it may be noted that the third face 1424 is far from the first face 1420 in a 3D space. A distance in the 3D space may be determined based on a z-axis distance on an x axis 1400. That is, a z-axis distance 1404 between the first face 1420 and the third face 1424 is large, relative to a z-axis distance 1402 between the first face 1400 and the second face 1402.

Even though the third face 1424 and the first face 1420 are on the same z axis 1420, if the third face 1424 has a large z-axis distance, this implies that the third face 1424 is far from the first face 1420 in an actual 3D space. Therefore, the third face 1424 is highly likely to be unknown to the user (that is, the first face 1420), and the UE may determine that the third face 1424 is an unknown face. Herein, to eliminate the unknown face 1424 in the left side of the picture-taking range, the UE may output a signal 1410 indicating left movement of the picture-taking range, for example.

Figure 15:
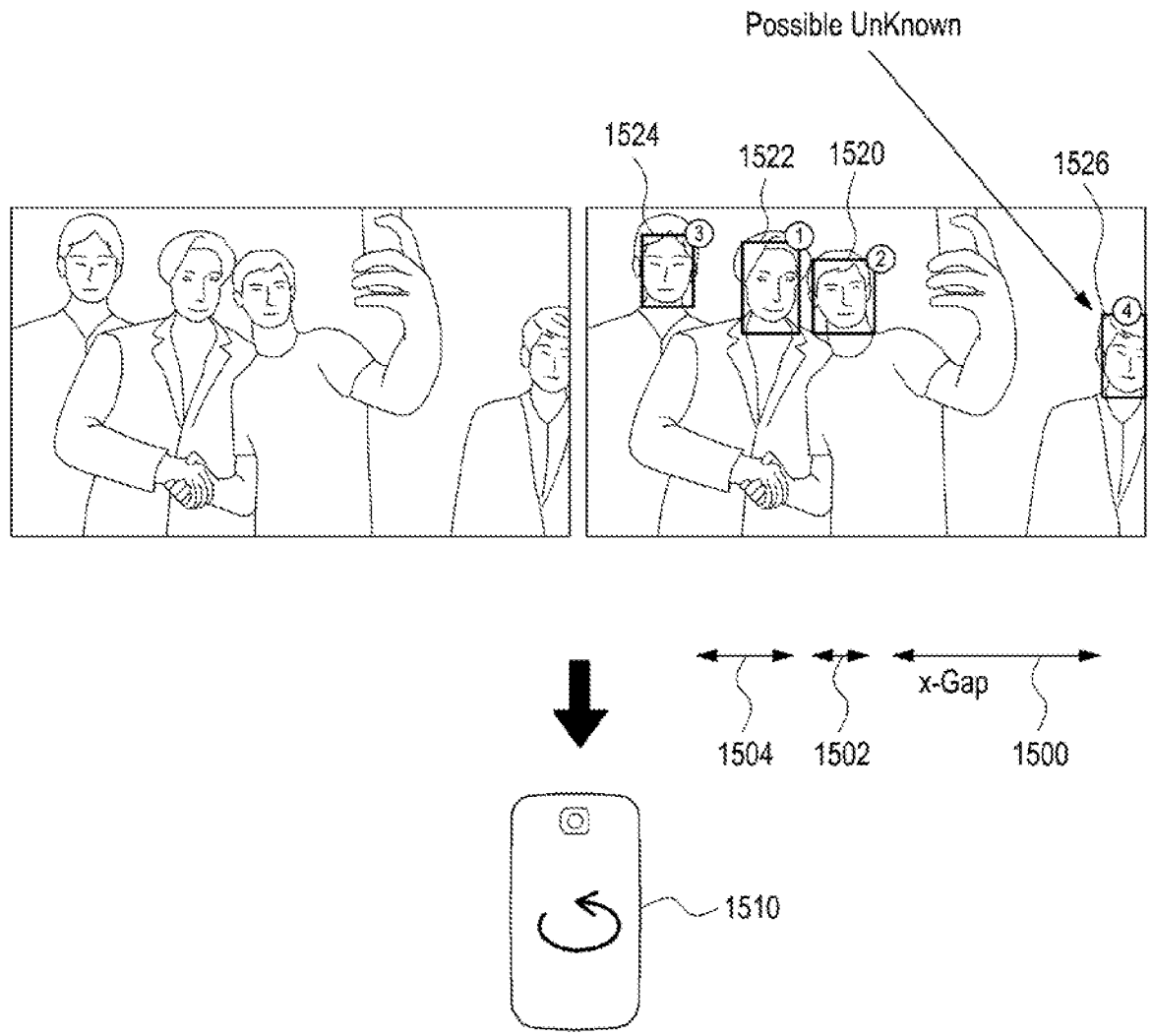
FIG. 15 is another exemplary view illustrating a case in which an unknown face is recognized in a picture-taking range in a UE equipped with a camera according to the present disclosure.

FIG. 15 is another exemplary view illustrating a case in which an unknown face is recognized in a picture-taking range in a UE equipped with a camera according to the present disclosure.

The left image of FIG. 15 is an exemplary picture-taking range of the UE. Faces recognized in the picture-taking range by the UE are represented as squares 1520, 1522, 1524, and 1526 in the right image.

The UE calculates x-axis gaps of the faces recognized in the picture-taking range. An x-axis gap 1502 on a 2D plane between the first face 1520 and the second face 1522 is similar to an x-axis gap 1504 on the 2D plane between the second face 1520 and the third face 1524. However, it may be noted that an x-axis gap 1500 between the first face 1520 and the fourth face 1526 is relatively large.

If the fourth face 1526 has a relatively large x-axis gap as described above, the UE may determine that the fourth face 1526 is an unknown face. Hence, to eliminate the unknown face 1526 in the right side of the picture-taking range, the UE may output a signal 1510 indicating right turn of the picture-taking range, for example.

FIG. 16 is another exemplary view illustrating a case in which an unknown face is recognized in a picture-taking range in a UE equipped with a camera according to the present disclosure.

The UE may cluster fiducial points within recognized faces based on the proximities of the 2D-plane positions of the fiducial points, and determine that a face within a cluster having a small number of fiducial points is an unknown face.

Figure 16A:
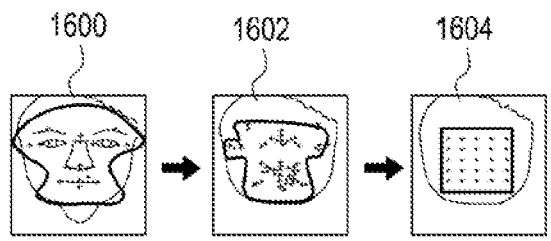
FIG. 16 is another exemplary view illustrating a case in which an unknown face is recognized in a picture-taking range in a UE equipped with a camera according to the present disclosure.

Specifically, the UE may sense fiducial points of recognized faces. FIG. 16(a) illustrates an exemplary process of determining squares surrounding faces by recognizing fiducial points through a camera of the UE. That is, the UE may determine squares surrounding faces by recognizing fiducial points in the order of 1600, 1602, and 1604.

Figure 16B:
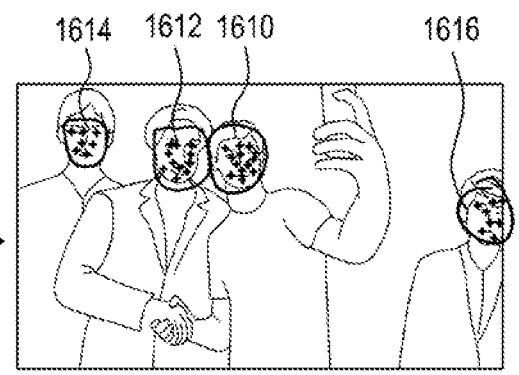
Figure 16D:
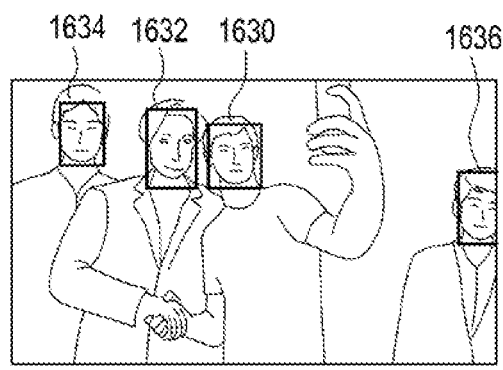

The UE may set an area in which fiducial points are gathered as a cluster. FIG. 16(b) illustrates exemplary clusters 1610, 1612, 1614, and 1616, each being a set of fiducial points of a face that the UE has recognized in a picture-taking range.

Figure 16C:
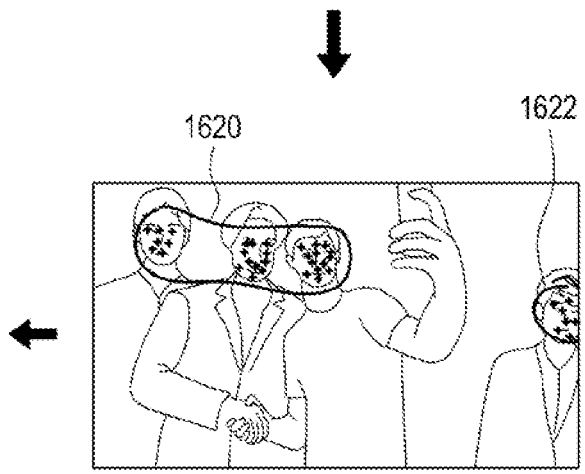

The UE may merge clusters close to each other on a 2D plane into one cluster. FIG. 16(c) illustrates an exemplary cluster 1620 into which the clusters 1610, 1612, and 1614 have been merged. Herein, since there is no cluster close to the cluster 1616, the cluster 1616 is kept as a new cluster 1622 without being merged.

The UE may determine a face 1636 included in the cluster 1622 including a smaller number of fiducial points between the clusters 1620 and 1622. FIG. 16(*d*) illustrates an example of determining the face 1636 among the recognized faces 1630, 1632, 1634, and 1636 as an unknown face.

Figure 17:
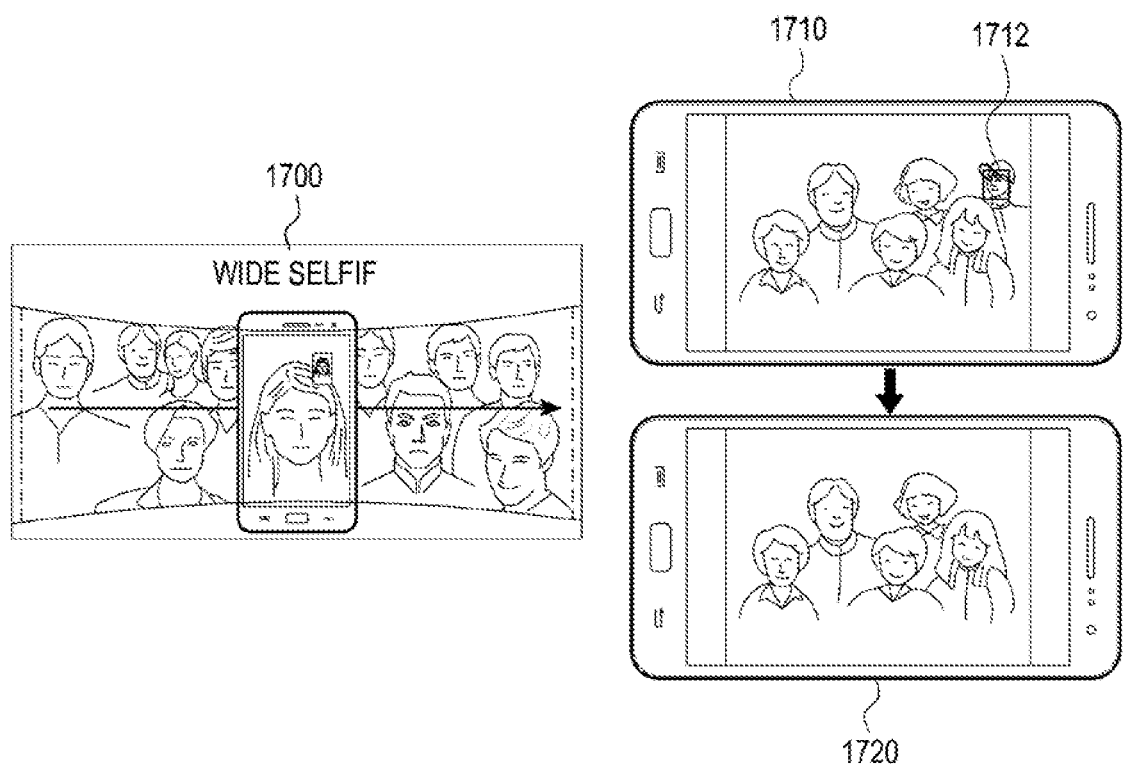
FIG. 17 is an exemplary view illustrating a case in which an unknown face is recognized in a picture-taking range and applied to a wide shot in a UE equipped with a camera according to the present disclosure.

FIG. 17 is an exemplary view illustrating a case in which an unknown face is recognized in a picture-taking range and applied to a wide shot in a UE equipped with a camera according to the present disclosure.

The unknown face recognition method of the present disclosure is also applicable to a wide selfie taken in a wide picture (like a panoramic picture) by moving the UE. An image 1700 is a picture of a plurality of persons taken by a wide selfie shot.

In an image 1710 generated by the wide selfie shot, a face 1712 at the top right end may be determined to be an unknown face according to the present disclosure. For example, since the face 1712 has a largest z-axis distance, the face 1712 may be determined to be an unknown face. Herein, the UE may automatically crop the unknown face 1712 by a post-process of the image 1710. Thus, the UE may generate a new wide selfie picture 1720 that does not include the unknown face.

Figure 18:
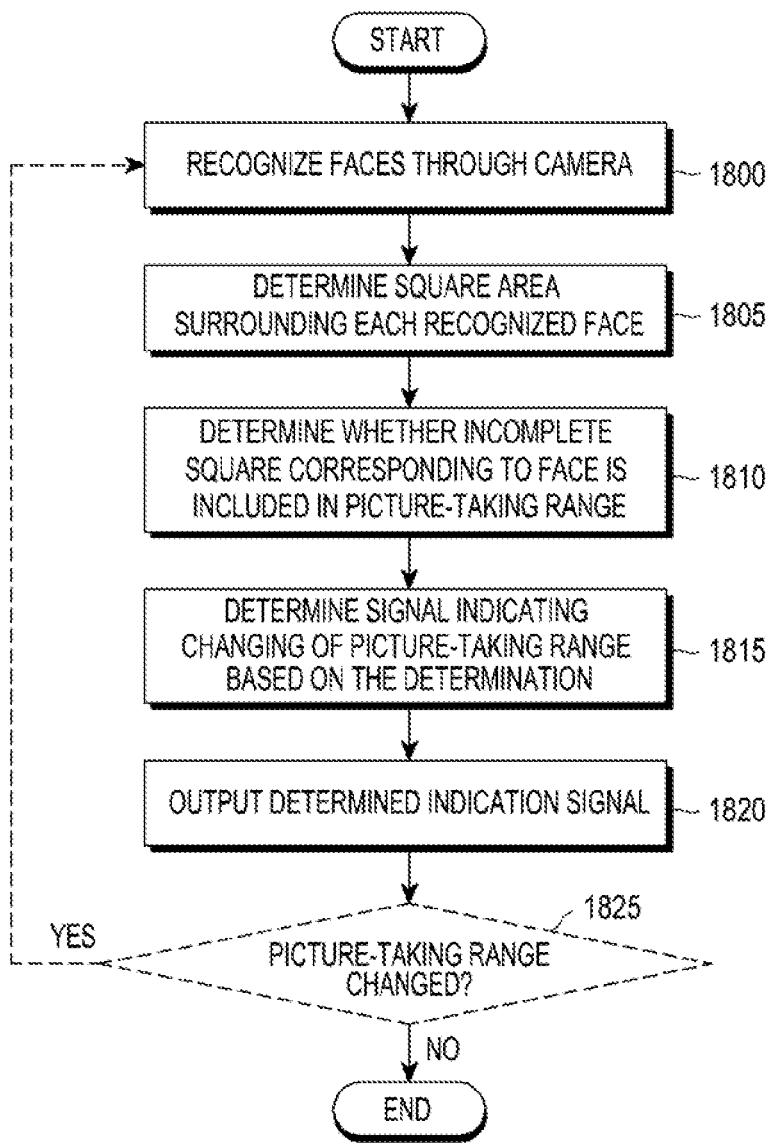
FIG. 18 is an exemplary view illustrating a process of recognizing a cut face in a picture-taking range and outputting a signal indicating changing of the picture-taking range in a UE equipped with a camera according to the present disclosure.

FIG. 18 is an exemplary view illustrating a process of recognizing a cut face in a picture-taking range and outputting a signal indicating changing of the picture-taking range in a UE equipped with a camera according to the present disclosure.

The camera of the UE may be driven by, for example, a camera application. Once the camera of the UE is driven, the UE performs face recognition on subjects in a picture-taking range (1800).

The UE determines a square area surrounding each of the recognized faces (1805). The square may be determined to include even a buffer area to surround an area such as the hair or ears as well as the face.

The UE may determine whether a cut face is included by checking whether the square corresponding to the face is fully included in the picture-taking range (1810). For example, the UE may determine whether a face has been cut off based on a ratio of the square corresponding to the recognized face included in the picture-taking range. That is, if only a part of a specific square, smaller than a threshold ratio (for example, 0.95) is included in the picture-taking range, the UE may determine that the face corresponding to the specific square is a cut face.

The UE may determine that the picture-taking range needs to be changed according to the result of the determination, and determine a signal indicating changing of the picture-taking range (1815). For example, if determining that there is a cut face in the left side of the current picture-taking range, the UE may determine a signal indicating 'turn left' or 'move left' in any of various available forms (a visual signal, a sound signal, or a vibration signal) because the picture-taking range needs to be extended to the left. An example of determining the indication signal at the UE will be described in greater detail with reference to FIG. 19.

Subsequently, the UE may output the determined signal (1820). Optionally, the UE may simultaneously output the indication signal in two or more forms having the same meaning.

Optionally, the UE may further perform an operation of determining whether the user has changed the picture-taking range after outputting the signal indicating changing of the picture-taking range (1825). In this case, the UE may support an improved selfie shot by performing operations 1810 to 1820 again.

Figure 19:
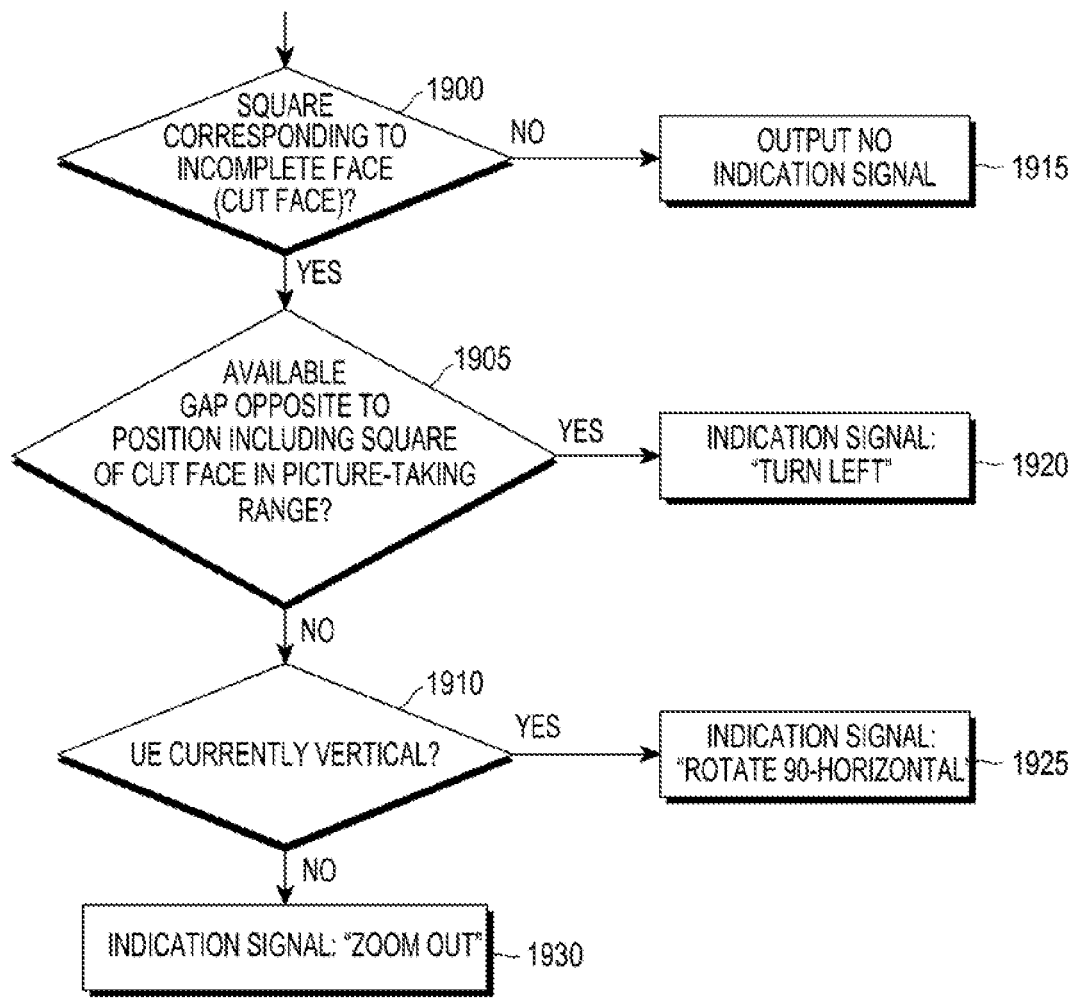
FIG. 19 is an exemplary view illustrating a case in which a cut face is recognized in a picture-taking range and a signal indicating changing of the picture-taking range is determined in a UE equipped with a camera according to the present disclosure.

FIG. 19 is an exemplary view illustrating a case in which a cut face is recognized in a picture-taking range and a signal indicating changing of the picture-taking range is determined in a UE equipped with a camera according to the present disclosure.

After operation 1810 of FIG. 18, the UE may perform the following operations optionally.

The UE may check whether a cut face is included (1900).

If determining that a cut face is not included, the UE may determine not to output an indication signal (1915).

If determining that a cut face is included, the UE may determine whether there is an available gap without a face in an opposite direction to a direction in which the square of the cut face is positioned (1905).

If there is an available gap in the opposite direction, the UE may output a signal indicating changing of the picture-taking range to fully include the square corresponding to the cut face in the picture-taking range. For example, the UE may determine to output an indication signal such as "turn left" (when there is a cut face in the left side of the picture-taking range) (1920).

If there is no available gap in the opposite direction, the UE may check whether the UE is currently placed vertically (1910).

If the UE is currently placed vertically, the UE may output a signal indicating horizontal positioning of the UE in order to further secure available gaps in the left and right sides. For example, the UE may determine to output an indication signal such as "rotate 90-horizontal" (1925).

If the UE is currently not placed vertically, the UE may not secure any more available gaps in the left and right sides. Thus, the UE may determine to output a signal such as "zoom-out" or "move backward" (1930).

Figure 20A:
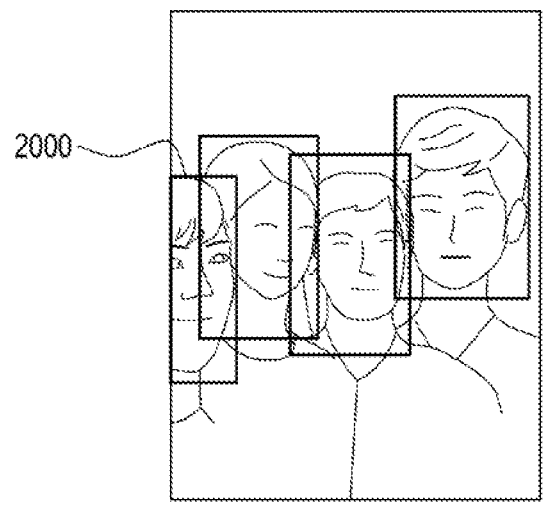
FIG. 20 is an exemplary view illustrating a method for recognizing a cut face in a picture-taking range, taking an actual picture for example in a UE equipped with a camera according to the present disclosure.
Figure 20B:
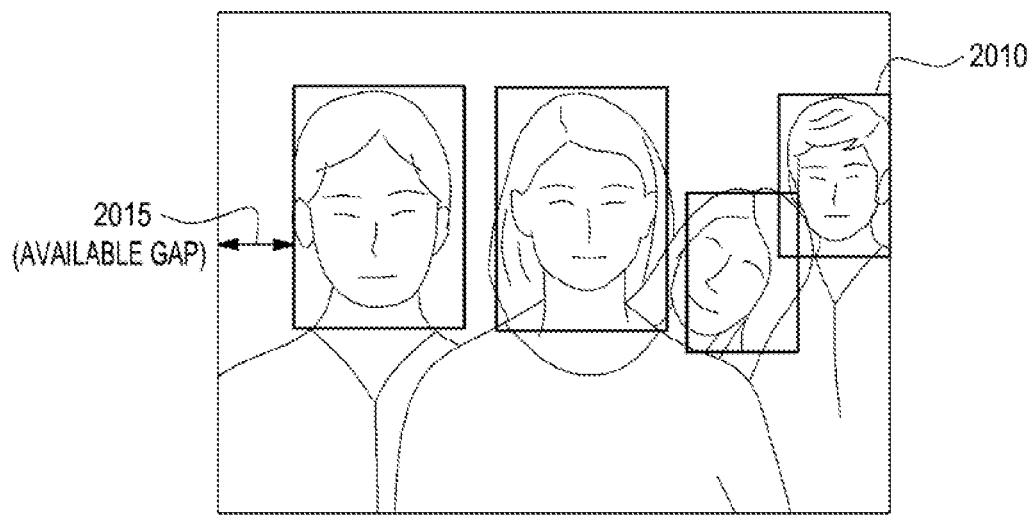

FIG. 20 is an exemplary view illustrating a method for recognizing a cut face in a picture-taking range, taking an actual picture for example in a UE equipped with a camera according to the present disclosure.

Referring to FIG. 20(*a*) as an example, the UE recognizes four faces in a picture-taking range, and determines four squares corresponding to the recognized four faces. A leftmost square 2000 among the four squares is not fully included in the picture-taking range. The UE may determine that a face corresponding to the square 2000 which is 'not complete' is a 'cut face'. Therefore, the UE may determine to output a signal indicating changing of the picture-taking range in order to include the cut face fully in the picture-taking range.

Referring to FIG. 20(*b*) as an example, the UE recognizes four faces in a picture-taking range, and determines four squares corresponding to the recognized four faces. A part of a rightmost square 2010 among the four squares is not included in the picture-taking range. The UE may determine that a face corresponding to the square 2010 which is not partially included is a 'cut face'. Herein, the UE determines that there is an available gap 2015 in the opposite direction (that is, the left side) to a direction (that is, the right side) in which the cut face 2010 is positioned, and determine to output an indication signal such as 'turn right' or 'move right' to extend the picture-taking range in the direction in which the cut face is positioned.

Figure 21:
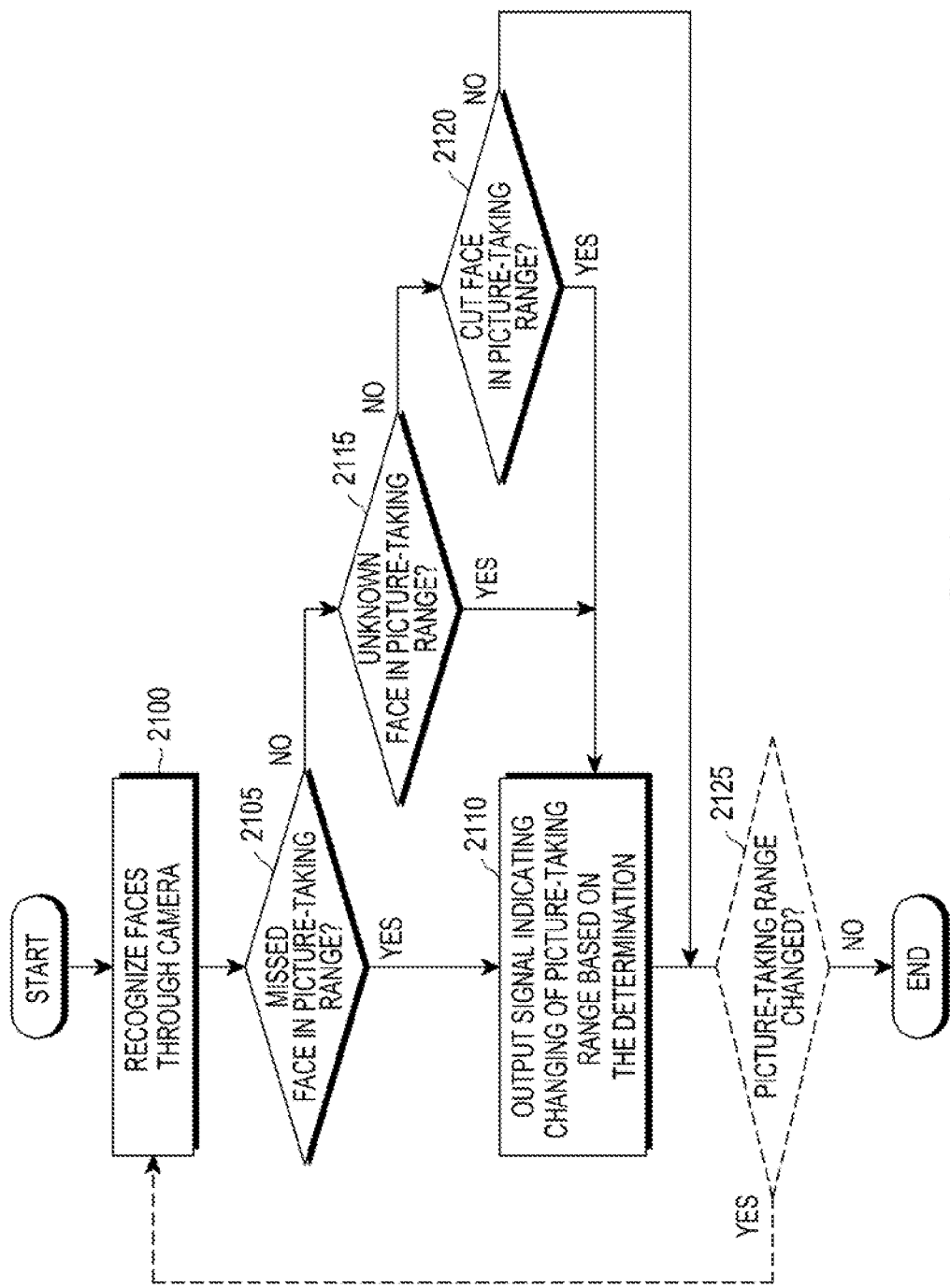
FIG. 21 is an exemplary flowchart illustrating a method for determining the need for changing a picture-taking range, sequentially in three cases in a UE equipped with a camera according to the present disclosure.

FIG. 21 is a flowchart illustrating an exemplary method for determining the need for changing a picture-taking range, sequentially in three cases in a UE equipped with a camera according to the present disclosure.

The camera of the UE may be driven by, for example, a camera application. Once the camera of the UE is driven, the UE may perform face recognition on subjects in a picture-taking range of the camera (2100).

The UE may sequentially perform at least one of an operation 2105 of determining whether there is a cut face in the picture-taking range, an operation 2115 of determining whether there is an unknown face in the picture-taking range, and an operation 2120 of determining whether a face is missed in the picture-taking range, using information about the recognized faces. However, the UE may make the determinations in any other order, not limited to the order illustrated in FIG. 21. If determining that there is a cut face, an unknown face, or a missed face, the UE may determine a signal indicating changing of the picture-taking range.

Subsequently, the UE may output the determined indication signal based on at least one of the determinations made in operations 2105, 2115, and 2120 (2110).

Optionally, the UE may further perform an operation of determining whether the user has changed the picture-taking range after outputting the signal indicating changing of the picture-taking range (2125). In this case, the UE may support an improved selfie shot by performing at least one of the operations 2100 to 2120 again.

Figure 22:
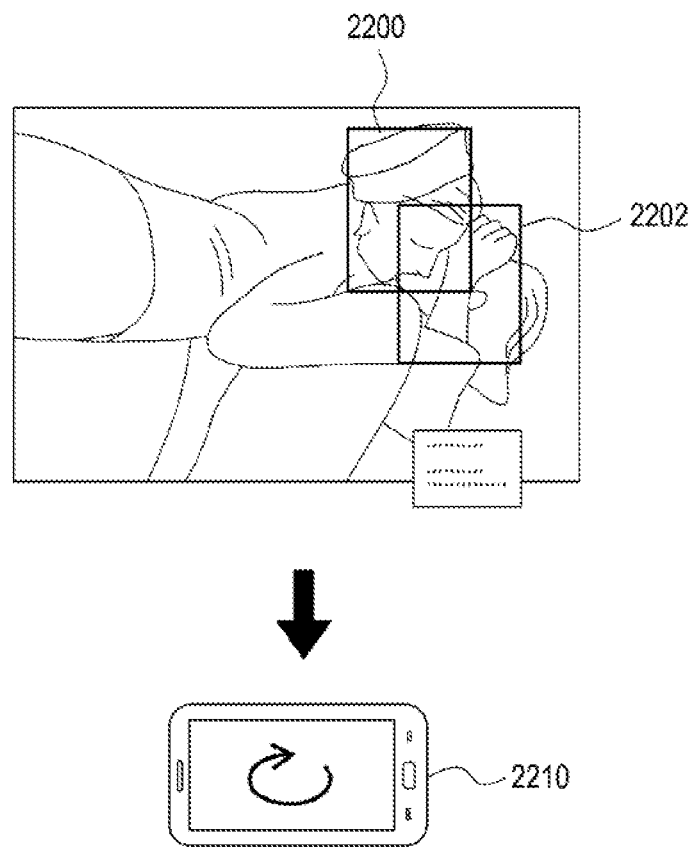
FIG. 22 is an exemplary view illustrating output of a signal indicating changing of a picture-taking range regarding an exemplary picture in a UE equipped with a camera according to the present disclosure.

FIG. 22 is an exemplary view illustrating output of a signal indicating changing of a picture-taking range regarding an exemplary picture in a UE equipped with a camera according to the present disclosure.

In FIG. 22, it may be noted that both of faces 2200 and 2202 recognized in a picture-taking range gather in the right side. In this case, the UE may output an indication signal to place the faces 2200 and 2202 at the center of the picture-taking range. For example, the UE may output a signal 2210 indicating 'turn left' to extend the picture-taking range to the right.

Figure 23:
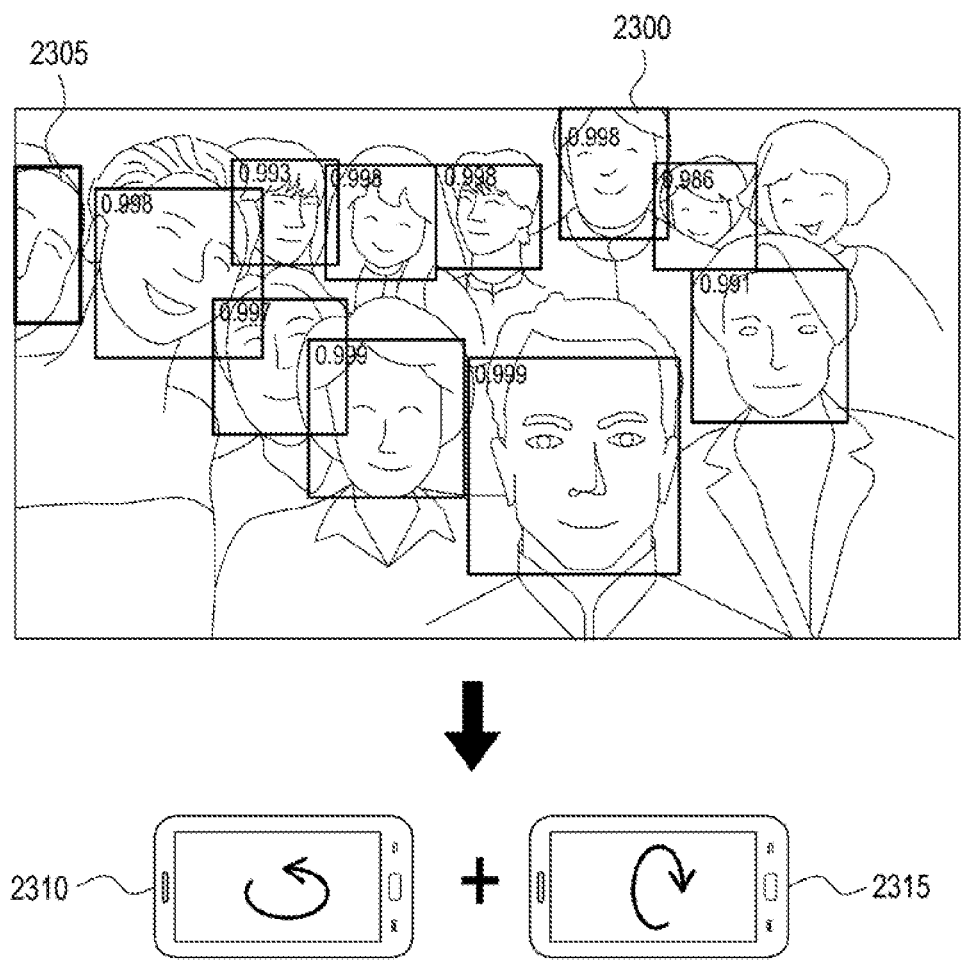
FIG. 23 is another exemplary view illustrating output of a signal indicating changing of a picture-taking range regarding an exemplary picture in a UE equipped with a camera according to the present disclosure.

FIG. 23 is another exemplary view illustrating output of a signal indicating changing of a picture-taking range regarding an exemplary picture in a UE equipped with a camera according to the present disclosure.

In FIG. 23, a square 2305 surrounding a leftmost face and a square 2300 surrounding an uppermost face in a picture-taking range contact a periphery (that is, a boundary) of the picture-taking range. The UE may determine that the squares 2305 and 2300 are incompletely included in the picture-taking range, and thus represent cut faces. In this case, the UE may output a signal indicating full inclusion of the squares corresponding to the cut faces 2305 and 2300 in the picture-taking range. For example, the UE may output signals 2310 and 2315 indicating 'rotate left' and 'rotate upward', respectively in order to extend the picture-taking range to the left and upward.

Figure 24:
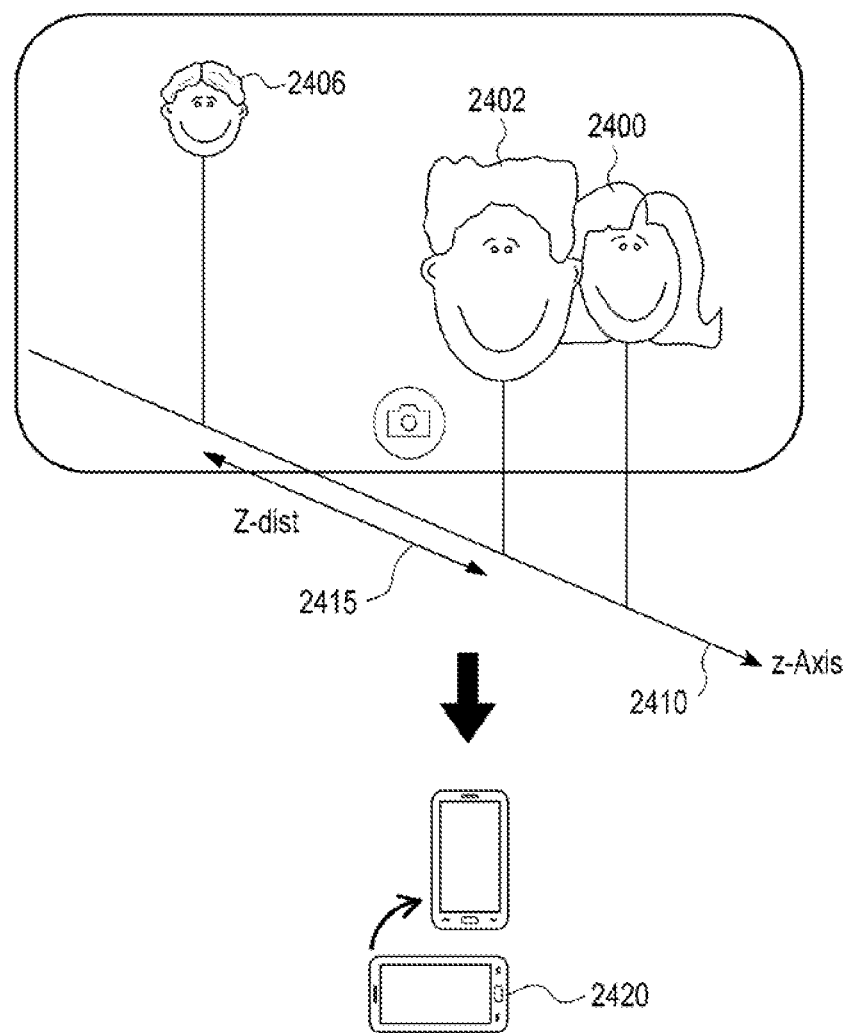
FIG. 24 is another exemplary view illustrating output of a signal indicating changing of a picture-taking range regarding an exemplary picture in a UE equipped with a camera according to the present disclosure.

FIG. 24 is another exemplary view illustrating output of a signal indicating changing of a picture-taking range regarding an exemplary picture in a UE equipped with a camera according to the present disclosure.

In FIG. 24, three recognized faces 2400, 2402, and 2406 are arranged on a z axis 2410 in the picture-taking range. Among the recognized faces, the left face 2406 has a large z-axis distance 2415 (for example, equal to or larger than a threshold) to the center face 2402. The UE may determine that the left face 2405 having the large z-axis distance is an unknown face. In this case, the UE may output an indication signal to eliminate the unknown face 2406 in the picture-taking range. For example, the UE may output a signal 2420 indicating 'rotate 90-vertical' to change the picture-taking range from a current horizontal composition to a vertical composition.

Figure 25:
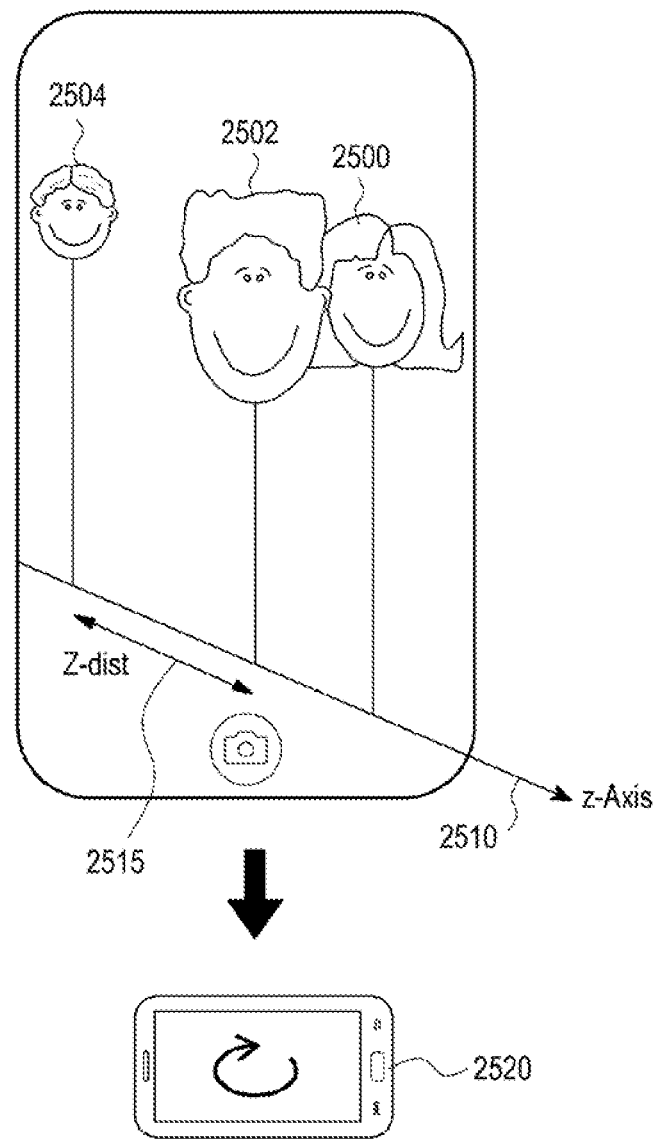
FIG. 25 is another exemplary view illustrating output of a signal indicating changing of a picture-taking range regarding an exemplary picture in a UE equipped with a camera according to the present disclosure.

FIG. 25 is another exemplary view illustrating output of a signal indicating changing of a picture-taking range regarding an exemplary picture in a UE equipped with a camera according to the present disclosure.

In FIG. 25, three recognized faces 2500, 2502, and 2504 are arranged on a z axis 2510 in the picture-taking range. Among the recognized faces, the left face 2504 has a large z-axis distance 2515 (for example, equal to or larger than a threshold) to the center face 2502. The UE may determine that the left face 2504 having the large z-axis distance is an unknown face. In this case, the UE may output an indication signal to eliminate the unknown face 2504 in the picture-taking range. For example, to eliminate the unknown face 2504 in the picture-taking range, the UE may output a signal 2520 indicating 'turn left' to extend the picture-taking range to the right.

Figure 26:
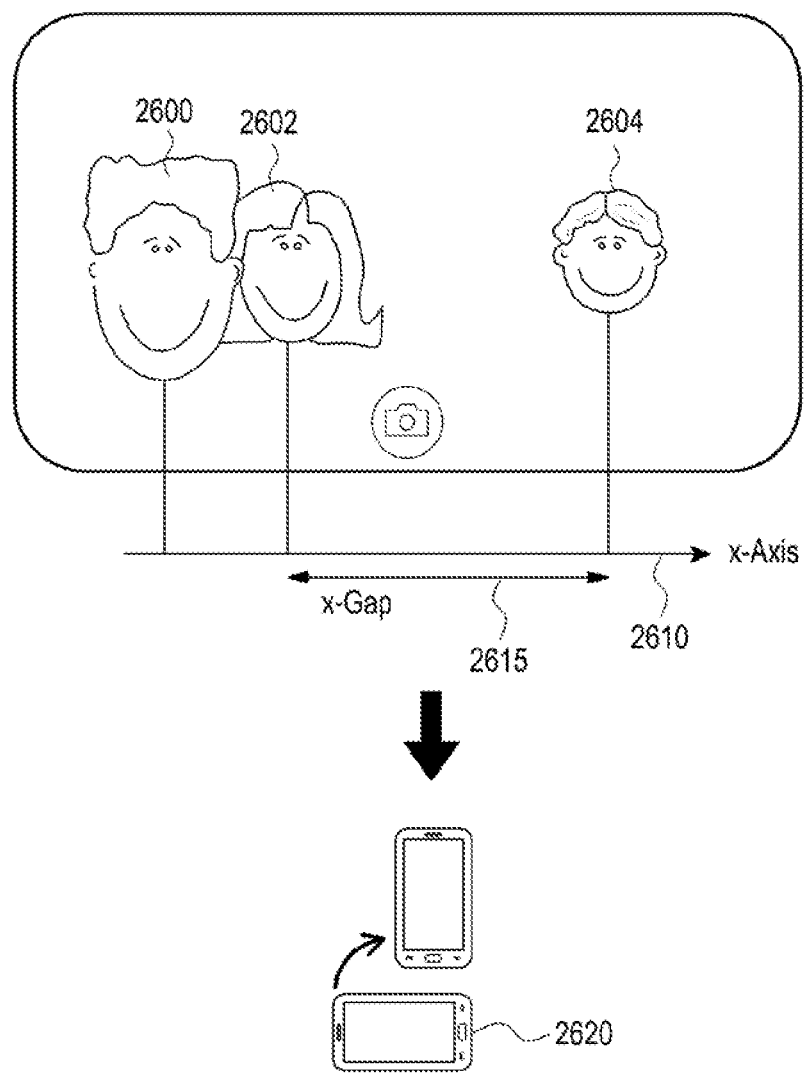
FIG. 26 is another exemplary view illustrating output of a signal indicating changing of a picture-taking range regarding an exemplary picture in a UE equipped with a camera according to the present disclosure.

FIG. 26 is another exemplary view illustrating output of a signal indicating changing of a picture-taking range regarding an exemplary picture in a UE equipped with a camera according to the present disclosure.

In FIG. 26, three recognized faces 2600, 2602, and 2604 are arranged on an x axis 2610 in the picture-taking range. Among the recognized faces, the right face 2604 has a large x-axis gap 2615 (for example, equal to or larger than a threshold) to the center face 2602. The UE may determine that the right face 2604 having the large x-axis gap is an unknown face. In this case, the UE may output an indication signal to eliminate the unknown face 2604 in the picture-taking range. For example, the UE may output a signal 2620 indicating 'rotate 90-vertical' to change the picture-taking range from a current horizontal composition to a vertical composition.

Figure 27:
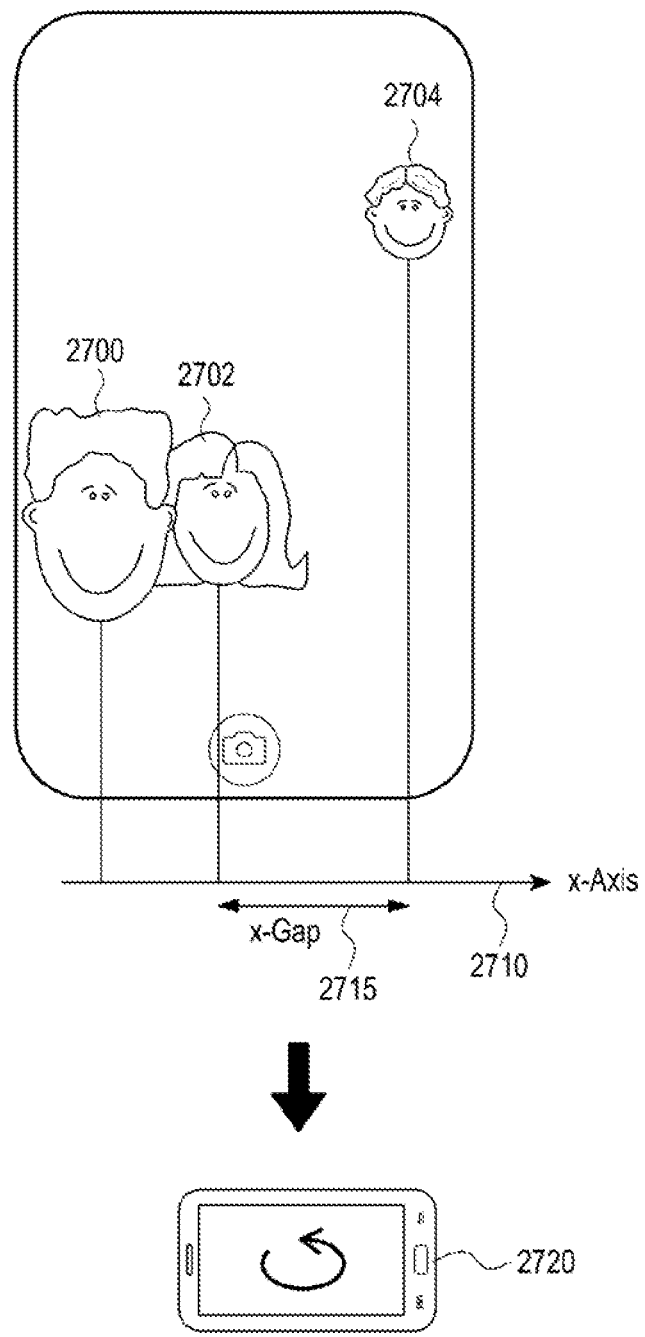
FIG. 27 is another exemplary view illustrating output of a signal indicating changing of a picture-taking range regarding an exemplary picture in a UE equipped with a camera according to the present disclosure.

FIG. 27 is another exemplary view illustrating output of a signal indicating changing of a picture-taking range regarding an exemplary picture in a UE equipped with a camera according to the present disclosure.

In FIG. 27, three recognized faces 2700, 2702, and 2704 are arranged on an x axis 2710 in the picture-taking range. Among the recognized faces, the right face 2704 has a large x-axis gap 2715 (for example, equal to or larger than a threshold) to the center face 2702. The UE may determine that the right face 2704 having the large x-axis gap is an unknown face. In this case, the UE may output an indication signal to eliminate the unknown face 2704 in the picture-taking range. For example, the UE may output a signal 2720 indicating 'turn right' to extend the picture-taking range to the left.

Figure 28:
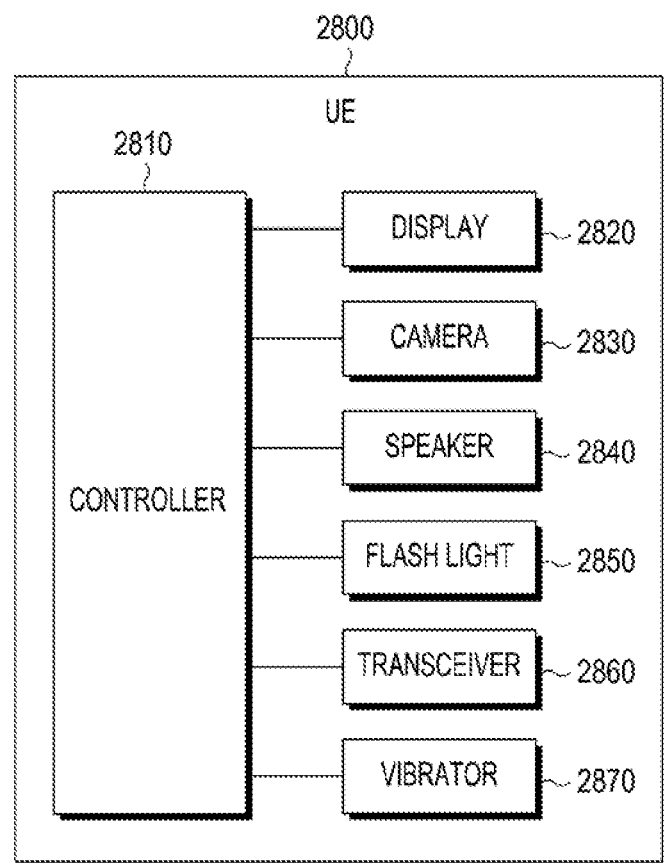
FIG. 28 is a block diagram illustrating a structure of a UE according to the present disclosure.

FIG. 28 is a block diagram of a UE according to the present disclosure.

According to the present disclosure, a UE 2800 may include a controller 2810 and a camera 2830. The controller 2810 may control the operation(s) described in the present disclosure. The camera 2830 may perform operations such as picture taking, face recognition, or calculation of a 3D z-axis coordinate under the control of the controller 2810.

The UE 2800 may further include at least one output unit for outputting at least one indication signal described in the present disclosure. For example, the output unit may be at least one of a display 2820 for outputting a visual signal, a speaker 2840 for outputting a sound, a flash light 2850 for outputting light, or at least one vibrator 2870 for generating vibrations. The UE 2800 may include a vibrator 2870 at each of at least two of the four ends of a housing.

The UE 2820 may further include a transceiver 2860 for communicating with a base station of a network or another UE.

It is to be noted that the exemplary picture-taking ranges, the flowcharts of the supporting methods, the exemplary indication signals, and the block diagram of a UE illustrated in FIGS. 2 to 28 are not intended to limit the scope of the present disclosure. That is, all components or steps illustrated in FIGS. 2 to 28 should not be interpreted as mandatory components for implementation of the present disclosure, and the present disclosure may be implemented even with a part of the components without departing from the scope and spirit of the present disclosure.

The afore-described operations may be performed by providing a memory device storing a corresponding program code in a component of a UE. That is, a controller of the UE may perform the afore-described operations by reading the program code stored in the memory and executing the program code by a processor or a central processing unit (CPU).

Various components and modules of a UE described in the present disclosure may operate using hardware circuits such as a combination of a hardware circuit such as a complementary metal oxide semiconductor-based logic circuit, firmware, and software and/or hardware and firmware and/or software embedded in a machine-readable medium. For example, various electrical structures and methods may be implemented using electrical circuits such as transistors, logic gates, and ASICs.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method for picture-taking in an apparatus equipped with a camera, the method comprising:
    recognizing a face of a subject in a picture-taking range of the camera based on the camera being driven;
    determining a signal indicating changing of the picture-taking range, based on information about the recognized face; and
    outputting the signal indicating the changing of the picture-taking range, based on the determining,
    wherein the information about the recognized face comprises a number of other faces located in a vicinity of the recognized face, stored as a radial graph for the recognized face, and
    the determining further comprises:
        determining that there is a missed face in the picture-taking range, if a number of the other faces of a radial graph for the recognized face in a previous picture-taking range has a different value from a radial graph for the recognized face in the picture-taking range, and
        determining the signal indicating the changing of the picture-taking range based on the missed face being in the picture-taking range.

2. The method of claim 1, wherein the signal is at least one from among a visual signal, a sound signal, and a vibration signal, indicating the changing of the picture-taking range.

3. The method of claim 2, wherein the signal is the visual signal output as an image or an icon through a display of the apparatus.

4. The method of claim 2, wherein the signal is the visual signal output as light through a light emitting diode flash light of the apparatus.

5. The method of claim 2, wherein the signal is the vibration signal output as vibrations generated from a vibrator provided at each of at least two of four edges of a housing of the apparatus.

6. The method of claim 1, wherein the determining further comprises:
    determining whether there is an unknown face in the picture-taking range, based on the information about the recognized face; and
    determining the signal indicating the changing of the picture-taking range further based on the determining that there is the unknown face in the picture-taking range.

7. The method of claim 1, wherein the determining further comprises:
    determining whether there is a cut face in the picture-taking range, based on the information about the recognized face; and
    determining the signal indicating the changing of the picture-taking range further based on the determining that there is the cut face in the picture-taking range.

8. The method of claim 1, wherein the signal is one from among a first signal indicating a rotation of the apparatus in a specific direction, a second signal indicating a movement of the apparatus in a specific direction, a third signal indicating an orientation change of the apparatus from a horizontal orientation or a vertical orientation to the vertical orientation or the horizontal orientation, and a fourth signal indicating a manipulation of a zoom function of the camera.

9. The method of claim 6, wherein the information about the recognized face is a z-axis distance to at least one of the other faces or an x-axis gap to the at least one of the other faces, from the recognized face in the picture-taking range, and
    the determining whether there is the unknown face in the picture-taking range comprises determining the at least one of the other faces as the unknown face in the picture-taking range, if the z-axis distance or the x-axis gap is larger than a predetermined threshold.

10. The method of claim 7, wherein the information about the recognized face is a square area including a fiducial point of the recognized face, and
    the determining whether there is the cut face in the picture-taking range comprises determining that there is the cut face in the picture-taking range, if the square area of the recognized face is not fully included in the picture-taking range.

11. The method of claim 6, wherein the information about the recognized face is information about at least two clusters merged according to proximities of fiducial points recognized in the picture-taking range, and
    the determining whether there is the unknown face in the picture-taking range comprises determining that a face included in a cluster having a smaller number of fiducial points among the at least two clusters is the unknown face.

12. An apparatus for picture-taking, the apparatus comprising:
    a camera configured to acquire a picture of a subject and recognize a face of the subject in a picture-taking range; and
    a controller configured to determine a signal indicating changing of the picture-taking range based on information about the recognized face, and control output of the signal indicating the changing of the picture-taking range based on the determining, wherein the information about the recognized face comprises a number of other faces located in a vicinity of the recognized face, stored as a radial graph for the recognized face, and the controller is further configured to determine that there is a missed face in the picture-taking range, if a radial graph for the recognized face in a previous picture-taking range has a different value from a radial graph for the recognized face in the picture-taking range, and determine the signal indicating the changing of the picture-taking range based on the missed face being in the picture-taking range.

13. The apparatus of claim 12, wherein the signal is at least one from among a visual signal, a sound signal, and a vibration signal, indicating the changing of the picture-taking range.

14. The apparatus of claim 13, wherein the signal is the visual signal output as an image or an icon through a display of the apparatus.

15. The apparatus of claim 13, wherein the signal is the visual signal output as light through a light emitting diode flash light of the apparatus.

16. The apparatus of claim 13, wherein the signal is the vibration signal output as vibrations generated from a vibrator provided at each of at least two of four edges of a housing of the apparatus.

17. The apparatus of claim 12, wherein the signal is one from among a first signal indicating a rotation of the apparatus in a specific direction, a second signal indicating a movement of the apparatus in a specific direction, a third signal indicating an orientation change of the apparatus from a horizontal orientation or a vertical orientation to the vertical orientation or the horizontal orientation, and a fourth signal indicating a manipulation of a zoom function of the camera.

* * * * *